(12) United States Patent
Smith

(10) Patent No.: US 11,935,423 B2
(45) Date of Patent: Mar. 19, 2024

(54) ATHLETIC TRAINER SYSTEM

(71) Applicant: Darren Michael Smith, Hillsboro, OR (US)

(72) Inventor: Darren Michael Smith, Hillsboro, OR (US)

(73) Assignee: Darren Michael Smith, Hillsboro, OR (US)

( * ) Notice: Subject to any disclaimer, the term of this patent is extended or adjusted under 35 U.S.C. 154(b) by 0 days.

(21) Appl. No.: 16/220,285

(22) Filed: Dec. 14, 2018

(65) Prior Publication Data

US 2020/0193863 A1 Jun. 18, 2020

(51) Int. Cl.
*A63F 13/00* (2014.01)
*A63B 26/00* (2006.01)
*A63B 69/00* (2006.01)
*G09B 19/00* (2006.01)

(52) U.S. Cl.
CPC .......... *G09B 19/0038* (2013.01); *A63B 26/00* (2013.01); *A63B 69/00* (2013.01); *A63B 2225/20* (2013.01); *A63B 2225/685* (2013.01)

(58) Field of Classification Search
CPC . A63B 71/0672; A63B 69/00; A63B 69/0071; A63B 69/002
See application file for complete search history.

(56) References Cited

U.S. PATENT DOCUMENTS

| 7,951,045 B1 | 5/2011 | Brader | |
| 2009/0117525 A1* | 5/2009 | Bavaro | A63B 69/002 434/247 |
| 2013/0073248 A1* | 3/2013 | Perkins | A63B 59/50 702/141 |
| 2013/0095959 A1* | 4/2013 | Marty | G06V 40/23 473/448 |
| 2013/0115583 A1* | 5/2013 | Gordon | G16H 40/63 434/247 |
| 2014/0275850 A1* | 9/2014 | Venkatraman | G01S 5/017 600/301 |
| 2015/0054632 A1* | 2/2015 | Ben Ezra | A63B 43/00 340/323 R |
| 2015/0116122 A1 | 4/2015 | Laws | |
| 2015/0174441 A1 | 6/2015 | Junaid et al. | |
| 2016/0271447 A1 | 9/2016 | Cucco | |

FOREIGN PATENT DOCUMENTS

WO 2006-053000 5/2006

* cited by examiner

*Primary Examiner* — David L Lewis
*Assistant Examiner* — Eric M Thomas
(74) *Attorney, Agent, or Firm* — Schwabe, Williamson & Wyatt, P.C.

(57) ABSTRACT

Apparatuses, systems, and methods associated with an athletic trainer system for effective assessment of an athlete in real, or near real, time are disclosed herein. In embodiments, a sport marker may include wireless circuitry to establish a wireless connection with a mobile device and a processor coupled to the wireless circuitry. The processor may receive an indication of a location at which the sport marker is to be positioned, and cause instructions to be provided to a user to facilitate positioning of the sport marker at the location. Other embodiments may be described and/or claimed.

20 Claims, 13 Drawing Sheets

ATHLETIC TRAINER SYSTEM

TECHNICAL FIELD

The present disclosure relates to the field of athletic trainer systems. More particularly, the present disclosure relates to an athletic trainer system for effective assessment of an athlete in real, or near real, time.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Athletic training has long been a manual process with a coach or trainer having to individually assess the performance of each athlete one at a time or a few at time. For example, the coach or trainer would have a single athlete perform an athletic assessment test (such as a 40-yard dash, a vertical jump test, a three-cone drill, or other similar athletic assessment tests) and monitor the performance of the single athlete while other athletes waited their turn to perform the athletic assessment test. This approach often caused the coach or trainer to focus on the result of the athletic assessment test rather than the performance and technique displayed by the athlete. Further, the approach may leave other athletes (such as a remainder of a team of athletes) waiting for their turn to perform the athletic assessment test, which is inefficient for training of multiple athletes. The approach also makes it difficult to assess more complex athletic performances. Additionally, trainers may wish to assess the ability of athletes to follow instructions or execute complex tasks in a standardized way that enables the comparison of athletes, which is difficult when a manual assessment process is used. The trainers may also wish to develop training schedules for assessing and facilitating injury rehabilitation and symmetrical performance (such as by addressing weaknesses of the athletes), which can be challenging to manually develop.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
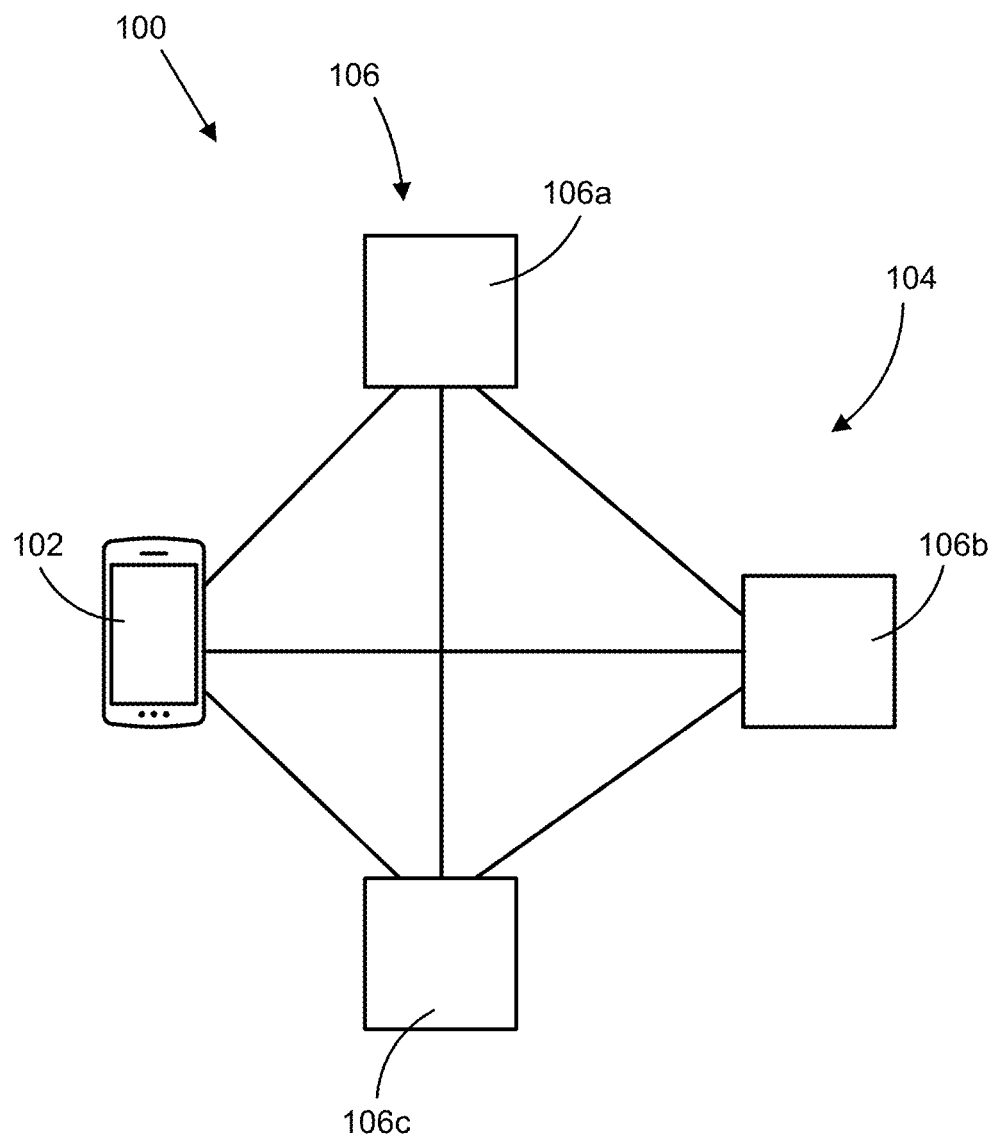
FIG. 1 illustrates an example trainer system 100, according to various embodiments.

Apparatuses, systems, and methods associated with an athletic trainer system for effective assessment of an athlete in real, or near real, time are disclosed herein. In embodiments, a sport marker may include wireless circuitry to establish a wireless connection with a mobile device and a processor coupled to the wireless circuitry. The processor may receive an indication of a location at which the sport marker is to be positioned, and cause instructions to be provided to an operator to facilitate positioning of the sport marker at the location.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Names are used in the description when providing examples of the operation of the subject matter disclosed herein. The names were randomly chosen and are not intended to be connected to or indicate any person that may have any of the same names used herein. Further, the data associated with the names is fictitious and was generated merely to illustrate data that could be captured and/or generated by the disclosed subject matter.

FIG. 1 illustrates an example trainer system 100, according to various embodiments. In particular, one embodiment of the trainer system 100 is illustrated in FIG. 1. The trainer system 100 may be utilized for training athletes. In particular, the trainer system 100 may provide drills for athletes to perform and may capture data associated with the performance of the drills by the athletes as the athletes progress through the drills. The captured data may be analyzed and utilized to determine a level of performance of the athletes for the drills.

The trainer system arrangement 100 may include a mobile device 102. The mobile device 102 is illustrated as a smart phone in the illustrated embodiment. However, it is to be understood that the mobile device 102 may be any computer device that is easily transported by a human (such as computer devices weighing less than 10 pounds) and that is capable of wireless communication with remote devices. For example, the mobile device 102 may comprise a smart phone, a laptop, a tablet, a phablet, or some combination thereof.

The mobile device 102 may include a processor and one or more memory devices. The one or more memory devices may comprise computer readable media that are capable of storing instructions. The processor may be coupled to the one or more memory devices and may access the instructions. Further, the processor may execute the instructions, which, when executed, cause the processor to perform one or more operations, which may include causing other components of the mobile device 102 to perform operations.

The mobile device 102 may further include wireless communication circuitry and an antenna. The wireless communication circuitry may be coupled to the antenna and the processor. The wireless communication circuitry and the antenna may provide for wireless communication with one or more or components of the trainer system. In some embodiments, the wireless communication circuitry and the antenna may further provide for wireless communication with a mobile network, such as a global positioning system network, a mobile telecommunication network, a cellular network, or some combination thereof.

The mobile device 102 may implement a software application utilized for configuration of the trainer system 100. In particular, the software application may cause a user interface to be displayed on a display of the mobile device 102. A user and/or an operator may interact with the user interface through a user input device (such as a touch screen, a keyboard, a mouse, buttons, or some combination thereof) to define a configuration of the trainer system 100. Further, the software application may facilitate arrangement of the trainer system 100, as described further throughout the disclosure. The software application may be accessed and/or implemented through a remote server (such as accessing and/or implementing via a website). In other embodiments, the mobile device 102 may have a plurality of instructions stored on one or more of the memory devices of the mobile device 102 that cause the software application to be implemented when the instructions are executed. In some embodiments, the instructions may receive from one or more of the other components of the trainer system 100 on initial establishment of wireless connection with the other components and the instructions may be stored in the memory devices for utilization by the mobile device 102.

The trainer system 100 may further include a sport marker system 104. The sport marker system 104 may be acquired and/or sold separately from the mobile device 102. The sport marker system 104 may include one or more sport markers 106. For example, the sport marker system 104 includes a first sport marker 106a, a second sport marker 106b, and a third sport marker 106c in the illustrated embodiment. The sport markers 106 may be physical objects for marking positions on a training area (such as a field) and/or training equipment utilized for training drills. For example, the sport markers 106 may comprise cones. In other embodiments, the sport markers 106 may comprise cones, pylons, flags, ladders, targets, gates (such as ski gates and/or racing gates), tackling dummies, tackling sleds, hurdles, hoops, goals, climbing holds, or some combination thereof.

The sport markers 106 may be capable of wireless communication with mobile device 102 or other ones of the sport markers 106. For example, the first sport marker 106a may wirelessly communicate with the mobile device 102, the second sport marker 106b, and the third sport marker 106c in the illustrated embodiment. Each of the sport markers 106 may include wireless circuitry and an antenna to facilitate the wireless communication. For example, the wireless circuitry may implement short range wireless communication, such as Wi-Fi, Bluetooth, near field communication, or some combination thereof. Further, the wireless circuitry may implement long range wireless communication in some embodiments, such as cellular communication, long term evolution (LTE), global positioning system (GPS) communication, global system for mobile communications (GSM), enhanced data rates for GSM evolution (EDGE), worldwide interoperability for microwave access (WiMAX), general packet radio services (GPRS), code division multiple access (CDMA), or some combination thereof. The sport markers 106 may utilize wireless communication for providing data captured by the sport markers 106 to the mobile device 102 and/or a mobile network for storage and analysis. Further, the sport markers 106 may receive, via the wireless communication, communications from the mobile device 102 that facilitate implementation of the drill, including positioning of the sport markers 106, operations to be performed by the sport markers 106, or some combination thereof. Each of the sport markers 106 may further utilize the wireless communication to determine positions of the other sport markers 106, such as distance to the other sport markers 106 and/or direction to the other sport markers 106.

Figure 2:
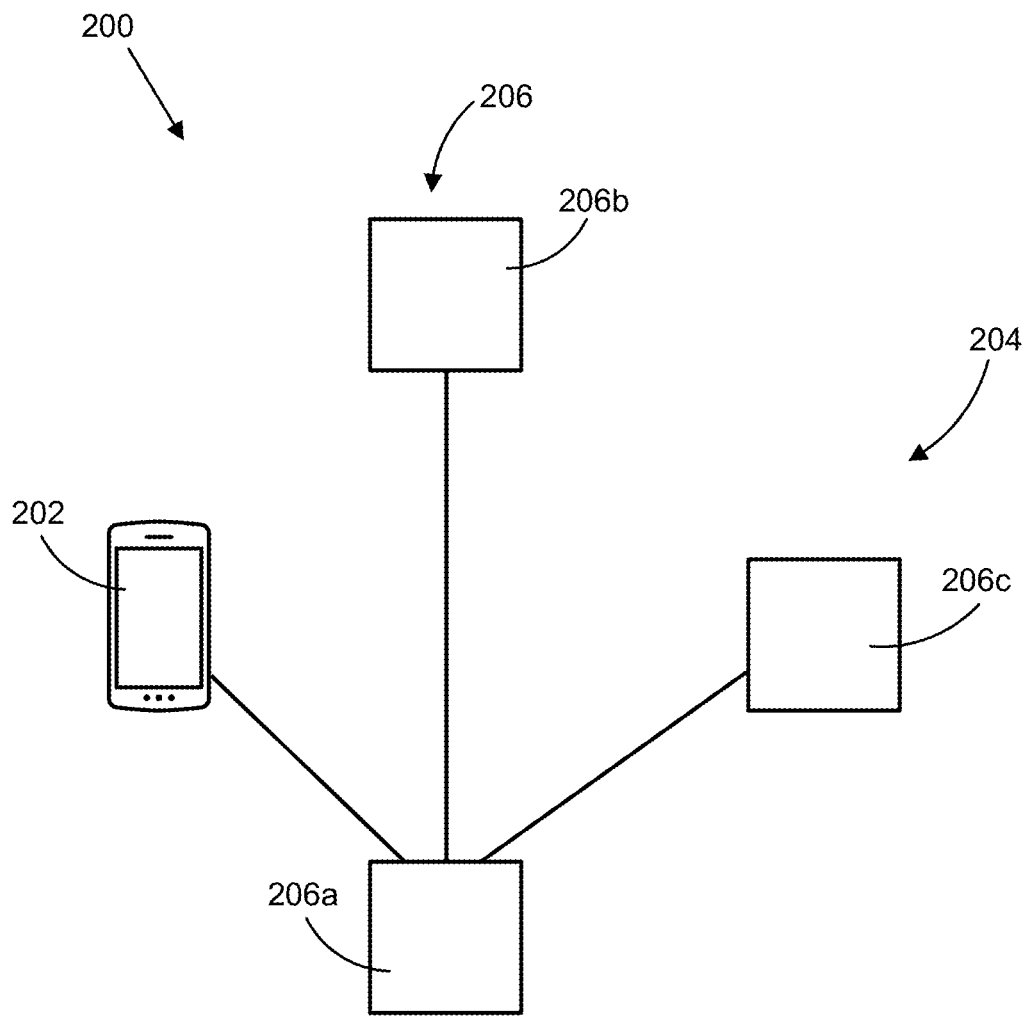
FIG. 2 illustrates another example trainer system 200, according to various embodiments.

FIG. 2 illustrates another example trainer system 200, according to various embodiments. The trainer system 200 may include one or more of the features of the trainer system 100 (FIG. 1). For example, the trainer system 200 may be utilized for training athletes. In particular, the trainer system 200 may provide drills for athletes to perform and may capture data associated with the performance of the drills by the athletes as the athletes progress through the drills. The captured data may be analyzed and utilized to determine a level of performance of the athletes for the drills. The trainer system 200 may include a mobile device 202, wherein the mobile device 202 includes one or more of the features of the mobile device 102 (FIG. 1). Further, the trainer system 200 may include a sport marker system 204 that include one or more sport markers 206, wherein the sport markers 206 include one or more of the features of the sport markers 106 (FIG. 1).

In the illustrated embodiment, the sport markers 206 may implement a master-slave configuration. For example, a first sport marker 206*a* may operate as a master, while the other sport markers 206 (i.e., a second sport marker 206*b* and a third sport marker 206*c* in the illustrated embodiment) may operate as slaves. In particular, the first sport marker 206*a* may wirelessly communicate with the mobile device 202, whereas the other sport markers 206 do not directly wirelessly communicate with the mobile device 202. The first sport marker 206*a* may receive communications from the mobile device 202 and analyze the communications to determine which portions of the communications should be transmitted by the first sport marker 206*a* to the other sport markers 206, and/or the first sport marker 206*a* may generate communications to be transmitted to the other sport markers 206 based on the communications received from the mobile device 202. In other embodiments, the first sport marker 206*a* may receive the communications from the mobile device 202 and forward all the communications on to the other sport markers 206.

Further, the second sport marker 206*b* and the third sport marker 206*c* may perform fewer operations than the first sport marker 206*a*, and may require less circuitry than the first sport marker 206*a* to perform the fewer operations. Accordingly, the second sport marker 206*b* and the third sport marker 206*c* having less circuitry can be produced more inexpensively than the first sport marker 206*a*, thereby reducing a cost of the sport marker system 204. For example, the second sport marker 206*b* and the third sport marker 206*c* may be limited to operations and corresponding circuitry for wirelessly communicating with the first sport marker 206*a*, sensing contact with the respective sport marker and/or proximity of an athlete to the respective sport marker, operate an indicator of the respective sport marker, or some combination thereof. In contrast, the first sport marker 206*a* may perform any of the operations described throughout this disclosure, and include corresponding circuitry to perform the operations, including wirelessly communicating with the mobile device 202 and the other sport markers 206, sensing contact with and/or proximity of an athlete to the first sport marker 206*a*, operate an indicator of the respective sport marker, trigger the other sport markers to perform operations, determine direction and distances to the other sport markers 206, capture data associated with an athlete performing a drill administered by the trainer system 200, transmit the captured data to the mobile device 202, or some combination thereof.

Figure 3:
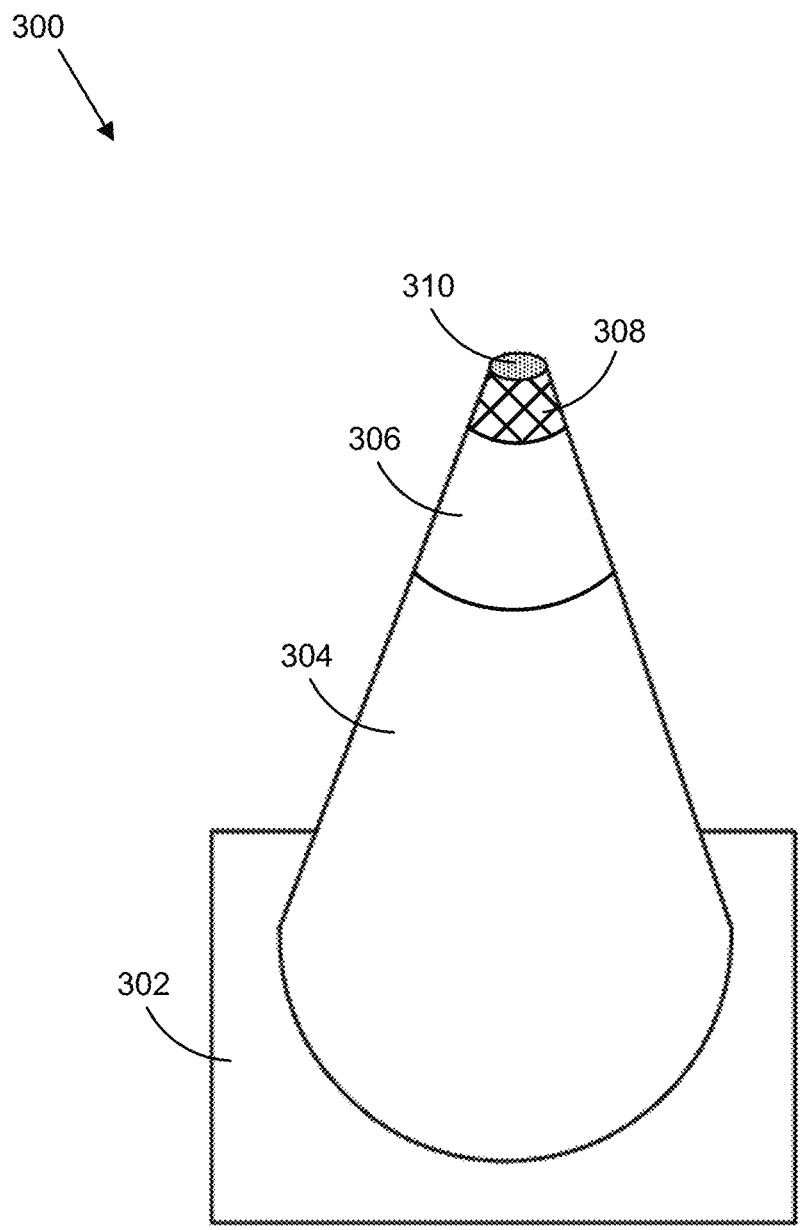
FIG. 3 illustrates an example sport marker 300, according to various embodiments.

FIG. 3 illustrates an example sport marker 300, according to various embodiments. In particular, the sport marker 300 illustrated is a cone. While the features of the sport marker 300 are described in relation to a cone, it is to be understood that other sport marker embodiments may include one or more of the features described in relation to the cone.

The sport marker 300 may have a base 302 and a body 304. The base 302 may be configured to be placed on a surface (such as field) and the body 304 be configured to extend away from the base 302 in a direction opposite to the surface when the base 302 is placed on the surface. The base 302 and the body 304 may be formed of a hardened rubber, plastic, or some combination thereof. In some embodiments, the base 302 may be weighted to reduce the risk of the sport marker 300 being knocked over.

The sport marker 300 may include an indicator 306. For example, the indicator 306 comprises a display in the illustrated embodiment. In other embodiments, the indicator 306 may comprise a mechanical display, such as analog gauges. The display may be a cathode ray tube (CRT) display, a light-emitting diode (LED) display, an electroluminescent display (ELD), a plasma display panel (PDP), a liquid crystal display (LCD), an organic light-emitting diode display (OLED), or some combination thereof. The indicator 306 may be located on a surface of the body 304 and/or may extend from the surface of the body 304. The indicator 306 may display an indication to a user (such as an athlete) of the sport marker, where the indication may indicate a direction, a message, an image, or some combination thereof. For example, the indicator 306 may display an arrow and an image of an individual in a running pose to indicate that the user is to run in the direction indicated by the arrow. In other embodiments, a portion of the indicator 306 may be configured to light up to indicate that the user is to proceed in a direction toward which the portion of the indicator 306 is lit up. Further, in some embodiments, the indicator 306 may indicate that a user has contacted or entered within a predefined proximity of the sport marker 300, such as by changing colors, changing a message displayed, changing an image displayed, or some combination thereof. In other embodiments, the indicator 306 may be omitted.

The sport marker 300 further may include a speaker 308. The speaker 308 may emit sounds and/or audible messages to the user. For example, the speaker 308 may emit a message and/or sound that indicates an action for a user to perform (such as to proceed in a certain direction and/or manner), completion of an action, or some combination thereof. While the speaker 308 is illustrated on the surface of the body 304, it is to be understood that the speaker 308 may be located inside the body 304 of the sport marker 300, inside the base 302 of the sport marker 302, or some combination thereof. Further, the speaker 308 may be waterproof, or otherwise protected from elements of the surrounding environment, to prevent or limit damage that may occur to the speaker 308 from elements of the surrounding environment, such as moisture. In other embodiments, the speaker 308 may be omitted.

The sport marker 300 may further include a contact sensor 310. The contact sensor 310 may sense contact by a user. For example, the contact sensor 310 may be button that detects a depression of the button. In other embodiments, the contact sensor 310 may be a capacitive touch sensor that detects contact with the capacitive touch sensor or a tilt switch that detects a change in the tilt of the sport marker 300. In other embodiments, the contact sensor 310 may be omitted.

Figure 4:
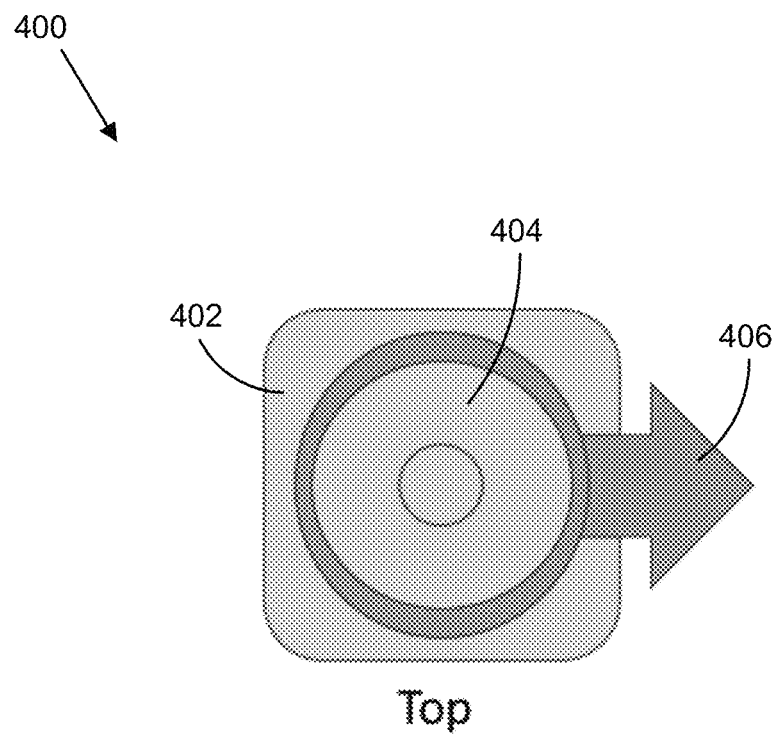
FIG. 4 illustrates a top view of another example sport marker 400, according to various embodiments.

FIG. 4 illustrates a top view of another example sport marker 400, according to various embodiments. The sport marker 400 may include one or more of the features of the sport marker 300 (FIG. 3). For example, the sport marker 400 may include a base 402 and a body 404.

The sport marker 400 further includes indicator 406. The indicator 406 may be a physical object that is coupled to body 404 and/or the base 402, and indicates an action for a user to perform. For example, the indicator 406 is an arrow that extends from the body to indicate a direction in which a user is to proceed from the sport marker 400. The indicator 406 may further be coupled to an actuator that can move the indicator, such as rotating the arrow around the body 404 to indicate a different direction in which the user is to proceed from the cone. The actuator may comprise a servomechanism, a servomotor, a motor, a stepper motor, or some combination thereof. In other embodiments, the indicator

406 may be manually rotatable about the sport marker 400 allowing a user to move the indicator 406 to a desired position.

Figure 5:
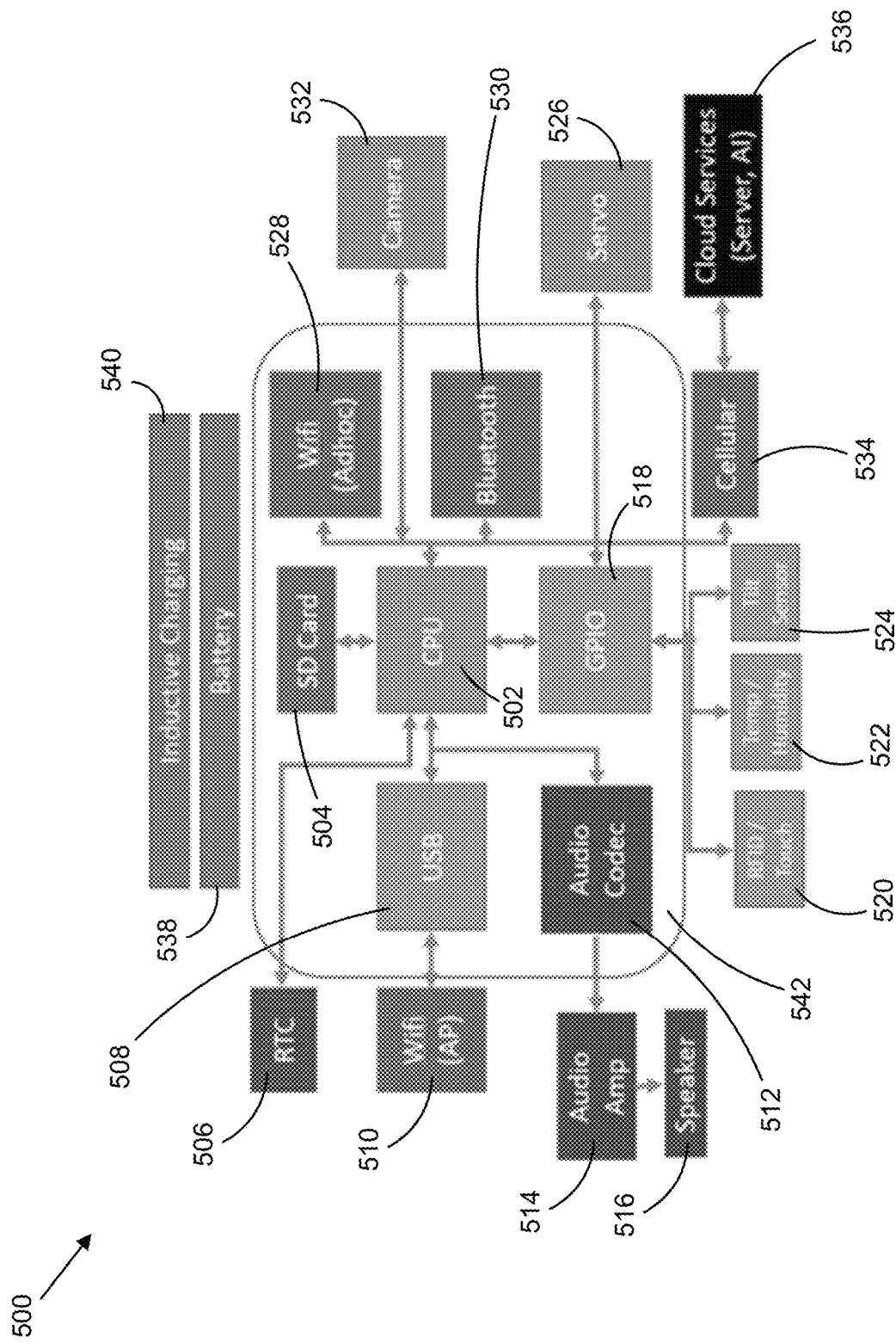
FIG. 5 illustrates a block diagram of example components of a trainer system 500, according to various embodiments.

FIG. 5 illustrates a block diagram of example components of a trainer system 500, according to various embodiments. For example, the components may be included in the trainer system 100 (FIG. 1). Further, a portion of the components may be included in one or more sport markers, such as the sport markers 106 (FIG. 1), the sport markers 206 (FIG. 2), the sport marker 300 (FIG. 3), and/or the sport marker 400 (FIG. 4).

The sport markers may include circuitry and sport marker elements to implement features of the sport markers. Each of the sport markers may include a processor, such as central processing unit (CPU) 502. The CPU 502 may control operation of other circuitry and sport marker elements of the sport marker. Further, the CPU 502 may receive and process signals and data received by the sport marker.

Each of the sport markers may further include a memory device, such as a secure digital (SD) card 504. The memory device may be coupled to the processor. The memory device may store instructions, that when performed by the processor, cause the processor to implement an operating system and/or one or more applications. Further, the memory device may be utilized to store data captured by other circuitry and sport marker elements of the sport marker. In some embodiments, the memory device may further store instructions that may be transmitted to a mobile device (such as the mobile device 102 (FIG. 1)) that can be utilized by the mobile device to implement an application that is utilized to interact with the sport markers.

Each of the sport markers may further include clock circuitry, such as real time clock (RTC) 506. The clock circuitry may maintain a clock for the sport marker, a sport marker system that includes the sport marker, or some combination thereof. The clock circuitry can maintain the clock while the sport marker is not wirelessly connected to an external clock source (such as the Internet) and/or a power source of the sport marker is in a low power state where other circuitry and sport marker elements may not function. Further, the clock circuitry may synchronize to a clock of an external clock source when the sport marker is wirelessly connected to the external clock source and maintain the clock after the sport marker is no longer wirelessly connected to the external clock source. The clock circuitry may be coupled to the processor and the processor may utilize the clock maintained by the clock circuitry to determine a time that an event occurred. For example, the processor may query the clock circuitry for a value of the clock in response to an event and associate (such as via a timestamp) the time with the event. The processor may then cause data related to the event to be stored with the associated time, such as being stored in the memory device of the sport marker, and/or being transmitted for storage on the mobile device or in the cloud.

Each of the sport markers may further include universal serial bus (USB) circuitry 508. The USB circuitry 508 may be coupled to the processor. The USB circuitry 508 may include one or more USB ports that may utilized to couple external devices to the process 502 using the USB communication standard. In some embodiments, the USB circuitry 508 may be utilized for a Wi-Fi connection, which may be additional to other Wi-Fi connections of the sport marker. For example, a Wi-Fi access point (AP) 510 may connected to one of the USB ports and provide a Wi-Fi connection. The Wi-Fi AP 510 may be utilized to provide web services to the sport marker, and/or to provide a user experience (UX) interface for a user and/or an operator of the trainer system 500. In other embodiments, the USB circuitry 508 and/or the Wi-Fi AP 510 may be omitted.

Each of the sport markers may further include an audio codec 512. The audio codec 512 may be coupled to the processor. The audio codec 512 may receive an electronic signal from the processor and convert the electronic signal to an audio signal. The audio signal may include feedback, notifications, and/or directions that can be audibly emitted from the sport marker. Each of the sport markers may further include an audio amplifier 514 and speaker 516. The audio codec 512 may be coupled to the audio amplifier 514 and may transit audio signals to the audio amplifier 514. The audio amplifier 514 may amplify the audio signals. The audio amplifier 514 may be coupled to the speaker 516 and may transmit the amplified audio signals to the speaker 516 to be emitted. The speaker 516 may include one or more of the features of the speaker 308 (FIG. 3). In some embodiments, the audio codec 512, the audio amplifier 514, and the speaker 516 may be omitted.

Each of the sport markers may further include one or more input/output (I/O) ports, such as the general purpose I/O (GPIO) ports 518. The I/O ports may be coupled to the processor and may provide for coupling of circuitry and/or sport marker elements to the processor. For example, a contact and/or proximity sensor 520 (referred to as "position sensor 520") may be connected to one of the I/O ports and coupled to the processor via the I/O port. The position sensor 520 may be utilized to determine a position of a user relative to the sport marker. For example, the position sensor 520 may determine when a user contacts the sport marker in embodiments where the position sensor 520 is a contact sensor. In the embodiments where the position sensor 520 is a contact sensor, the position sensor 520 may include one or more of the features of the contact sensor 310 (FIG. 3). In other embodiments, the position sensor 520 may determine when a user is within a proximity of the sport marker, when the position sensor 520 is a proximity sensor. For example, the user may be wearing a detectable object (such as a radio-frequency identification (RFID) tag and/or wirelessly-enabled device, including a heart monitor), which the position sensor 520 may detect when it is within a proximity when it is within a proximity of the sport marker. In some of these embodiments, the position sensor 520 may comprise an RFID sensor that is to detect RFID tags worn by the users. The position sensor 520 may transmit a signal via the I/O port to the processor to indicate that the position sensor 520 detected a contact of the user or that the user within a proximity of the sport marker.

Each of the sport markers may further include an environmental sensor 522. The environmental sensor 522 may be connected to one or more of the I/O ports and be coupled to the processor via the I/O ports. The environmental sensor 522 may sense one or more of the characteristics of the environment in which the sport marker is located. For example, the environmental sensor 522 may include a temperature and/or humidity of the environment. The environmental sensor 522 may be located within the sport marker or on a surface of the sport marker. The environmental sensor 522 may provide signals to the processor via the I/O ports indicating the temperature and/or the humidity of the environment.

Each of the sport markers may further include a tilt sensor 524. The tilt sensor 524 may be connected to one of the I/O ports and be coupled to the processor via the I/O port. The tilt sensor 524 may sense that a tilt of the sport marker has changed and/or a degree of tilt of the sport marker. In some embodiments, the tilt sensor 524 may further comprise an accelerometer to detect movement of the sport marker. The tilt sensor 524 may provide signals to the processor via the I/O ports indicating that the tilt of the sport marker has been changed, a degree at which the sport marker is tilted, and/or that the sport marker has been moved.

Each of the sport markers may further include an indicator controller, such as the servomechanism 526 or a stepper motor. The indicator controller may control operation of an indicator of the sport marker, such as the indicator 306 (FIG. 3) and/or the indicator 406 (FIG. 4). For example, the indicator controller may control what is displayed on the indicator in embodiments where the indicator is a display. In these embodiments, the indicator controller may be a display controller. In other embodiments, the indicator controller may comprise an actuator that controls positioning of a physical object indicator. For example, the indicator controller may rotate the arrow illustrated in FIG. 4. In these embodiments, the indicator controller may comprise the servomechanism 526, a servomotor, a motor, a stepper motor, or some combination thereof.

In some embodiments, one or more of the I/O ports, the position sensor 520, the environmental sensor 522, the tilt sensor 524, and/or the indicator controller may be omitted. In some embodiments, the I/O ports 518 may be accessible to a user and the user may plug I/O devices into the I/O ports 518. In these embodiments, the I/O devices may be plug-and-play devices that the processor may recognize and configure upon connection with the I/O ports.

Each of the sport markers may further include Wi-Fi circuitry 528. The Wi-Fi circuitry 528 may be coupled to the processor. The Wi-Fi circuitry 528 may comprise baseboard Wi-Fi circuitry utilized to communicate among the sport markers. For example, the Wi-Fi circuitry 528 may be utilized to transmit signals among the sport markers, determine distances between the sport markers, determine directions between the sport markers, or some combination thereof.

Each of the sport markers may further include Bluetooth circuitry 530. The Bluetooth circuitry 530 may be coupled to the processor. The Bluetooth circuitry 530 may detect wirelessly-enabled devices worn by a user and establish wireless connections with the devices. For example, the Bluetooth circuitry 530 may detect a heart-rate (HR) monitor with Bluetooth capability worn by a user and establish a connection with the HR monitor. The Bluetooth circuitry 530 may receive signals indicating HR data of the user and provide the signals to the processor, which may be utilized for storing the HR data. In some embodiments, the Bluetooth circuitry 530 may further receive identifiers from the devices and associate data received from each of the devices with a corresponding identifier for the device. In these embodiments, the identifier may be used to determine a user associated with the device and the data received from the device may be associated with the user during storage.

In some embodiments, the Wi-Fi circuitry 528 or the Bluetooth circuitry 530 may establish a wireless connection with a wirelessly-enabled camera 532. The camera 532 may be located separate from the sport marker. In particular, the camera 532 may be part of the trainer system 500 or may be a camera separate from the trainer system. The processor may trigger, via the Wi-Fi circuitry 528 or the Bluetooth circuitry 530, the camera 532 to capture image. In some embodiments, the processor may retrieve images captured by the camera 532 in digital format and associate the images with other data captured by the sport marker. For example, the processor may trigger the camera 532 to capture an image in response to position sensor 520 detecting a condition (such as detecting contact with the sport marker or a user being within a proximity of the sport marker) and associate the image with the condition, the user that produced the condition, other data captured in response to the condition, or some combination thereof. In some embodiments, the camera 532 may be omitted.

The trainer system 500 may further include long range wireless communication circuitry, such as cellular communication circuitry 534. The long-range wireless communication circuitry may include the cellular communication circuitry 534, LTE circuitry, GPS communication circuitry, GSM circuitry, EDGE circuitry, WiMAX circuitry, GPRS circuitry, CDMA circuitry, or some combination thereof. The long-range wireless communication circuitry may establish wireless connection with a remote server 536, where the remote server 536 may provide cloud services. For example, the cloud services may provide for central hosting of information (such as storage of data captured by the trainer system 500 and/or providing data for operation of the trainer system 500) and/or a website associated with the trainer system 500. Further, the cloud services may provide artificial intelligence to adapt a drill based on data captured during performance of the drill. For example, if heart rate (HR) data captured during the performance of the drill by a user indicates that the HR of the user exceeds a threshold HR (where the threshold HR may be a HR that is deemed safe for the user), the trainer system 500 may adapt future actions to be performed by the user during the drill in attempt to lower the HR of the user, or instruct the user to cease performance of the drill. The long-range wireless circuitry may be located within a mobile device (such as the mobile device 102 (FIG. 1) and/or the mobile device 202 (FIG. 2)). In other embodiments, the long-range wireless circuitry may be located in one or more of the sport markers.

Each of the sport markers may further include a power supply 538, such as the battery illustrated. The power supply 538 may be coupled to circuitry and/or sport marker elements located within the sport marker, and may provide power to the circuitry and/or the sport marker elements. While the power supply 538 is illustrated as only being coupled to the processor for simplicity, it is to be understood that the power supply 538 can be coupled directly to all of the circuitry and/or sport marker elements within the sport marker, coupled directly to a portion of the circuitry and/or sport marker elements within the sport marker, and/or coupled to the circuitry and/or sport marker elements via the processor. Further, the power supply 538 may provide power to devices connected to the I/O ports and the USB ports.

Each of the sport markers may further include charging circuitry 540. The charging circuitry 540 may be coupled to the power supply 538 and may be utilized for charging the power supply 538. The charging circuitry 540 may comprise inductive charging circuitry in some embodiments, and/or may provide for inductive charging of the power supply 538 when the sport marker is within a proximity of an inductive charging source device. In other embodiments, the charging circuitry 540 may provide for a wired connection to a power source utilized for charging the power supply 538. Further, the charging circuitry 540 may be omitted in other embodiments. In these embodiments, the power supply 538 may be accessible by the user and may be replaceable.

In some embodiments, a portion of the circuitry within the sport marker may be part of a single board computer device 542. For example, the processor, the memory device, the Wi-Fi circuitry 528, the Bluetooth circuitry 530, the I/O ports 518, the USB circuitry 508, and the audio codec 512 may be part of the single board computer device 542. In other embodiments, the single board computer device 542 may be omitted and the circuitry within the sport marker may be located on multiple printed circuit boards, may be separate from printed circuit boards, or some combination thereof.

Figure 6:
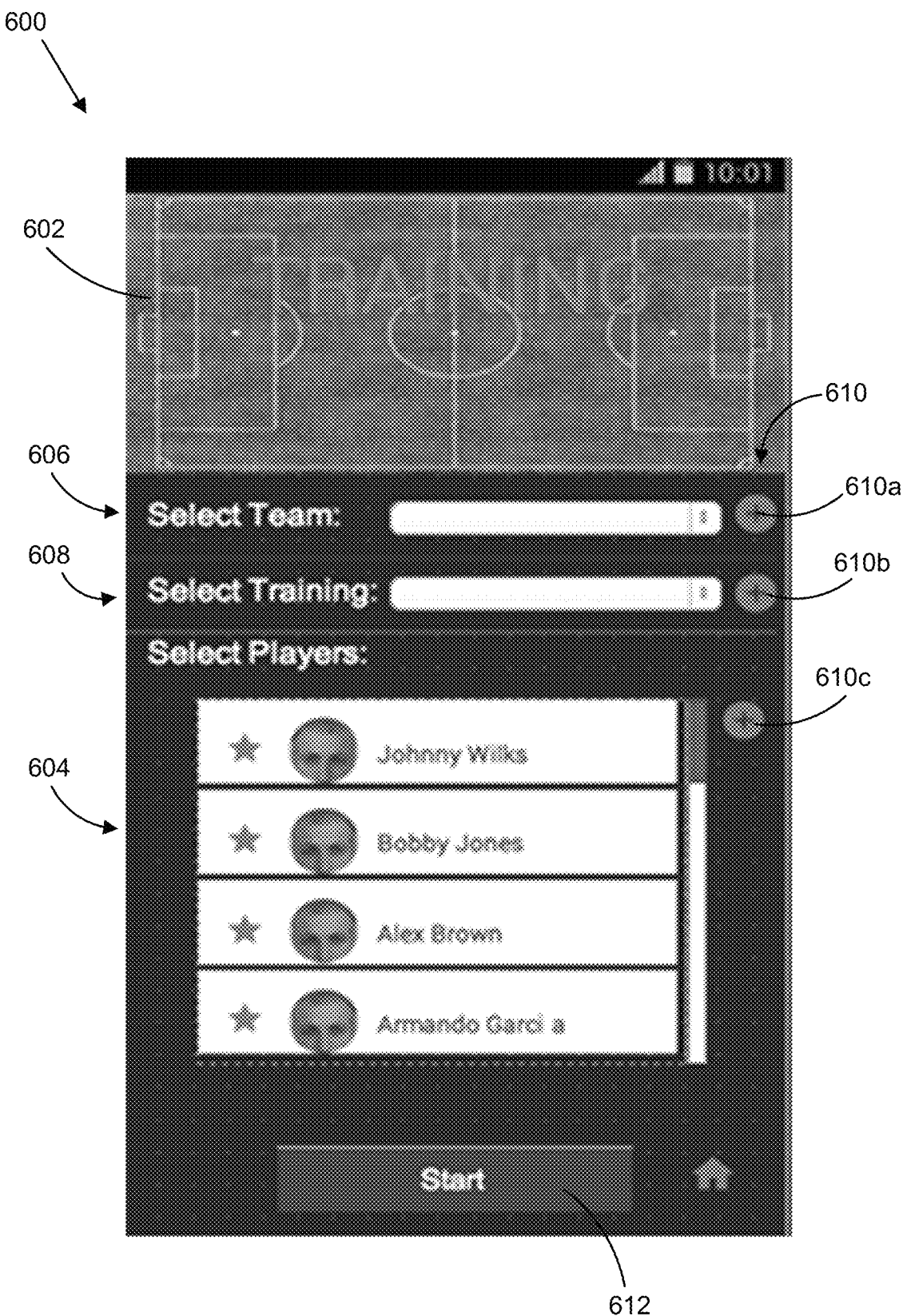
FIG. 6 illustrates an example user interface 600, according to various embodiments.

FIG. 6 illustrates an example user interface 600, according to various embodiments. The user interface 600 may be displayed by a software application operating on a mobile device (such as the mobile device 102 (FIG. 1) and/or the mobile device 202 (FIG. 2)). For example, the user interface 600 may be a webpage displayed within a web browser of the mobile device in some embodiments. The software application may be launched by an operator accessing the webpage or performing an action that causes the software application to launch (such as selecting an icon associated with the software application that is displayed on the mobile device). The software application may facilitate operation of the sport marker system (such as the sport marker system 104 (FIG. 1) and/or the sport marker system 204 (FIG. 2)). In response to the software application being launched, the mobile device may detect the sport markers that are available within the sport marker system. For example, the mobile device may query the sport marker system and receive indications of the sport markers available, which may include an indication of the type of sport markers (such as whether the sport markers are cones, pylons, flags, ladders, targets, gates, tackling dummies, tackling sled, hurdles, hoops, goals, climbing holds, or some combination thereof). In other embodiments, the mobile device may forgo detecting the sport markers until a later time. The operator may interact with a user input device of the mobile device to interact with the user interface 600.

The user interface 600 may include a representation 602 of a training surface. For example, the representation 602 shows a soccer field in the illustrated embodiment. An operator may interact with the user interface to change the representation 602 to show a training surface on which the user plans to use the sport marker system. For example, the operator may scroll through a plurality of predefined training surfaces (such as a soccer field, a football field, a basketball court, a hockey rink, a motocross track, a climbing walls, an obstacle course, and/or other sport fields, rinks, tracks, or courses) or enter dimensions of a training surface to indicate a training surface on which the user plans to use the sport marker system. The software application may utilize the indicated training surface to adapt a predefined drill for the indicated training surface, may provide certain predefined drills for selection based on the indicated training surface, may display the indicated training surface on which the operator may define a drill, or some combination thereof.

The user interface 600 may further include a list 604 of users (which may be referred to as athletes or players) to perform a drill being defined by the software application. The list 604 may include users associated with the mobile device, an operator of the mobile device (which may be determined by a sign-in process), or some combination thereof. The users for the list may be retrieved from a remote server, a memory device of the mobile device, or some combination thereof. The list 604 may be an ordered list that indicates an order in which the users are to perform the drill, where the operator can define the order. In other embodiments, the operator may select a single user from the list 604 that is going to complete the drill. Further, in other embodiments, the order of users within the list 604 may be irrelevant, where devices worn by each of the users may be utilized for determining which user is performing the drill at the time.

The user interface 600 may further include one or more filter selection fields 606. For example, the filter selection field 606 is a team filter selection field in the illustrated embodiment. The filter selection fields 606 may include a team filter selection field, a position filter selection field, or some combination thereof. The operator may select one or more values from the filter selection fields 606. In response to selection of the values, the list 604 may display users that meet criteria defined by the values. For example, the operator may select a certain team from the team filter selection field and the list 604 may display users associated with the team in response to the selection.

The user interface 600 may further include a training selection field 608. The training selection field 608 may present one or more drills, skills to be trained, and/or drill purposes (such as cool down, injury rehabilitation, cardio improvement, or some combination thereof) for selection. The drills, skills, and/or drill purposes presented by the training selection field 608 may depend on the indicated training surface from the representation 602, the users to perform the drill indicated with the list 604, the filter selections from the filter selection fields, the sport markers available for use (in embodiments where the available sport markers have been detected), or some combination thereof. For example, the training selection field 608 may present drills associated with actions that would be performed by a running back in response to the value of one of the filter selection fields 606 being 'running back,' while the training selection field 608 may present drills associated with actions that would be performed by a lineman in response to the value of one of the filter selection fields 606 being 'lineman.' Further, the training selection field 608 may present an operator defined selection that allows the operator to define a drill. In some embodiments, the representation 602 may be updated to show the drill to be performed based on the value selected in the training selection field 608.

The user interface 600 may further include one or more addition icons 610. An operator may interact with the addition icons 610 to add new elements to the representations (such as the representation 602), the fields (such as the filter selection field 606 and/or the training selection field 608), and/or the lists (such as the list 604) included in the user interface. For example, the user interface includes a filter addition icon 610*a*, a training addition icon 610*b*, and a user addition icon 610*c* in the illustrated embodiment. In response to operator interaction with one or more of the addition icons 610, the user interface 600 may display a prompt asking the operator to define the element to be added.

The filter addition icon 610*a* may be utilized to define a new element within the filter selection fields 606. For example, the filter addition icon 610*a* may be utilized to define a new team for the team filter selection field in the illustrated embodiment. In response to operator interaction with the filter addition icon 610*a*, the user interface 600 may display a prompt requesting input of a team name and selection of users to be included in the new team. The users may be selected from the list 604 of users. Once the prompt has been completed and accepted, the new team and the associated information associated may be stored (by storing in a memory device of the mobile device and/or storing via the cloud services). The new team may then be available for selection in the team filter selection field for future selection, where selection of the new team element in the team filter selection field will cause the list 604 to display the users selected to be part of the new team. In some embodiments, the operator may select a previously defined team in the prompt displayed in response to the operator interaction with the filter addition icon 610a and may update the previously defined team (such as adding or removing users).

The training addition icon 610b may be utilized to define a new element within the training selection field 608. In particular, the training addition icon 610b may be utilized to define a new drill that will be available for future selection in the training selection field 608. In response to operator interaction with the training selection field 608, the user interface 600 may display a prompt for operator input of a name of the new drill, a skill to be trained by the new drill, a purpose of the new drill, or some combination thereof. Further, the prompt can request indication of which of the name, the skill, or the purpose of the new drill is to be displayed in the training selection field 608. In response to completing the prompt and accepting the inputs in the prompt, a training pitch may be displayed for defining the actions to be performed during the drill (as is described further in FIG. 8). Once the operator has finished defining the drill and has accepted the changes, the new drill and the associated information may be stored (by storing in a memory device of the mobile device and/or storing via the cloud services). The new drill may then be available for selection in the team filter selection field for future selection.

The user addition icon 610c may be utilized to define a new user. In response to operator interaction with the user addition icon 610c, the user interface 600 may display a prompt for operator input of a name of the new user and information associated with the new user. For example, the information may include a team(s) with which the new user is to be associated, a position(s) which the new user normally plays, performance characteristics (such as dominant hand/foot) of the new user, any injury information for the new user, or some combination thereof. In response to completing the prompt and accepting the inputs in the prompt, the name and information associated with the new user may be stored (by storing in a memory device of the mobile device and/or storing via the cloud services). Further, the list 604 of users may be updated with the new user. The new user may then be available for selection in the list 604 of users for future selection.

The user interface 600 may further include a start icon 612. In response to operator interaction with the start icon 612, the software application may collect the information input into the user interface 600, and facilitate setup and performance of a drill based on the information. For example, the software application may present a user interface showing a drill in response to the operator interaction with the start icon 612 in some embodiments and facilitate setup of the drill. In some embodiments, the software application may further retrieve previous results of performing the drill for each of the indicated users to perform the drill, information (such as heart rate (HR)) associated with each of the indicated users captured during previous performance of the drill, other data captured by the sport marker system during each of the indicated users previous performance of the drill, or some combination, in response to the operator interaction with the start icon 612.

Figure 7:
FIG. 7 illustrates another example user interface 700, according to various embodiments.

FIG. 7 illustrates another example user interface 700, according to various embodiments. The user interface 700 may be displayed by a software application operating on a mobile device (such as the mobile device 102 (FIG. 1) and/or the mobile device 202 (FIG. 2)). For example, the user interface 700 may be a webpage displayed within a web browser of the mobile device in some embodiments. The user interface 700 may be displayed in response to operator interaction with the start icon 612 (FIG. 6).

The user interface 700 may illustrate a drill to be performed based on the inputs into the user interface 600 (FIG. 6). For example, the user interface 700 may illustrate a training surface representation 702. The training surface representation 702 may represent a training surface on which the drill is to be setup. The training surface may be the same training surface selected in the representation 602 (FIG. 6). The user interface 700 may further illustrate one or more sport marker indicators 704 located on the training surface representation 702. The sport marker indicators 704 may indicate where sport markers are to be positioned on the training surface. The user interface 700 may further indicate paths 706 between the sport markers that a user performing the drill is to traverse and an action (such as jog, sidestep, run, sprint, backpedal, karaoke step, high knee run, and/or high heel run) to be performed along each of the paths 706.

The mobile device may facilitate placement of the sport markers. For example, the user interface 700 may indicate (such as by changing the color of one of the sport marker indicators 704, causing one of the sport marker indicators 704 to flash, or some combination thereof) a location that a sport marker is to be positioned on the training surface. In the illustrated embodiments, a first sport marker indicator 704a is shown in a different color than the other sport marker indicators 704 to indicate that the operator is to place a sport marker in that location. In some embodiments, the user interface 700 may further indicate an identifier (such as a number or letter that may be displayed on the sport marker) of a sport marker that is to be positioned in the location. In some embodiments, the user interface 700 may indicate that the operator is turn on one of the sport markers, wait for an indication that one of the sport markers has been turned on, and identify the sport marker turned on as the marker that is to be positioned. In other embodiments, the sport marker to be positioned in the location may identify itself by emitting a sound from a speaker (such as the speaker 308 (FIG. 3) and/or the speaker 516 (FIG. 5)) of the sport marker and/or performing an operation (such as lighting up or rotating) with an indicator (such as the indicator 306 (FIG. 3) and/or the indicator 406 (FIG. 4)) of the sport marker.

The operator may proceed to the location with the sport marker. Once the sport marker is located at the position indicated by the first sport marker indicator 704a, the mobile device and/or the sport marker may provide an indication, such as emitting a sound, flashing, changing colors, performing an operation with the indicator, or some combination thereof. In some embodiments, the mobile device and the sport marker may be unable to determine when the sport marker is in the proper position (such as when the mobile device is not connected to GPS, and/or the sport marker is first sport marker to be positioned and depends on relationships between the sport markers for positioning), and may assume the operator will properly position the sport marker. Once the sport marker has been positioned, the operator may perform an operation (such as interacting with the mobile device and/or contacting a contact sensor (such as the contact sensor 310 (FIG. 3) of the sport marker)) to indicate that the sport marker has been positioned.

The mobile device may monitor for the indication that the sport marker has been positioned. In response to the mobile device detecting the indication, the mobile device may proceed to positioning the next sport marker. For example, the user interface 700 may indicate a location that a second sport marker is to be placed, which may include indicating (such as by changing the color of one of the sport marker indicators 704, causing one of the sport marker indicators 704 to flash, or some combination thereof) a location that a sport marker is to be positioned on the training surface. For example, the user interface may show a second sport marker indicator 704b in a different color than the other sport marker indicators 704 to indicate that the operator is to place a sport marker in that location. In some embodiments, the user interface 700 may further indicate an identifier (such as a number or letter that may be displayed on the sport marker) of a sport marker that is to be positioned in the location. In some embodiments, the user interface 700 may indicate that the operator is turn on one of the sport markers, wait for an indication that one of the sport markers has been turned on, and identify the sport marker turned on as the marker that is to be positioned. In other embodiments, the sport marker to be positioned in the location may identify itself by emitting a sound from a speaker (such as the speaker 308 (FIG. 3) and/or the speaker 516 (FIG. 5)) of the sport marker and/or performing an operation (such as lighting up or rotating) with an indicator (such as the indicator 306 (FIG. 3) and/or the indicator 406 (FIG. 4)) of the sport marker.

The operator may proceed to the location with the sport marker. As the operator proceeds to the location, the sport marker being positioned may determine its location relative to other sport markers already positioned and provide directions (such as through emitting sounds, and/or performing operations with an indicator (such as the indicator 306 (FIG. 3) and/or the indicator 406 (FIG. 4)). For example, the sport marker being positioned may count down a distance to the location and/or indicate a direction to the location as the operator proceeds to the location. Once the sport marker is located at the position indicated by the second sport marker indicator 704b, the mobile device and/or the sport marker may provide an indication, such as emitting a sound, flashing, changing colors, performing an operation with the indicator, or some combination thereof. The sport marker may determine that it is positioned at the position indicated by the second sport marker indicator 704b by determining the distance between the sport marker and the sport marker previously positioned at the position indicated by the first sport marker indicator 704a. Once the sport marker has been positioned, the operator may perform an operation (such as interacting with the mobile device and/or contacting a contact sensor (such as the contact sensor 310 (FIG. 3) of the sport marker)) to indicate that the sport marker has been positioned.

The user interface 700 may continue the procedure until sport markers are positioned at all the positions indicated by the sport marker indicators 704. Once an adequate number of sport markers have been positioned, each of the sport markers may utilize triangulation with reference to the other positioned sport markers to facilitate positioning of the sport markers and/or to determine that the sport markers have been positioned in the correct positions. After all the sport markers have been positioned, the mobile device and/or the sport markers may verify their positions. If it is determined that any of the sport markers are improperly positioned, a prompt may be displayed on the mobile device indicating which of the sport markers are improperly positioned and facilitating correcting the positioning of the improperly positioned sport markers. Once it is determined that all the sport markers have been properly positioned, the mobile device may switch to display a results user interface, monitor for a user interaction with the sport marker located at the first sport marker indicator 704a position to indicate that the users are performing the drill, or some combination thereof.

In other embodiments, the verification procedure may be omitted and the mobile device may proceed without performing the verification procedure.

Figure 8:
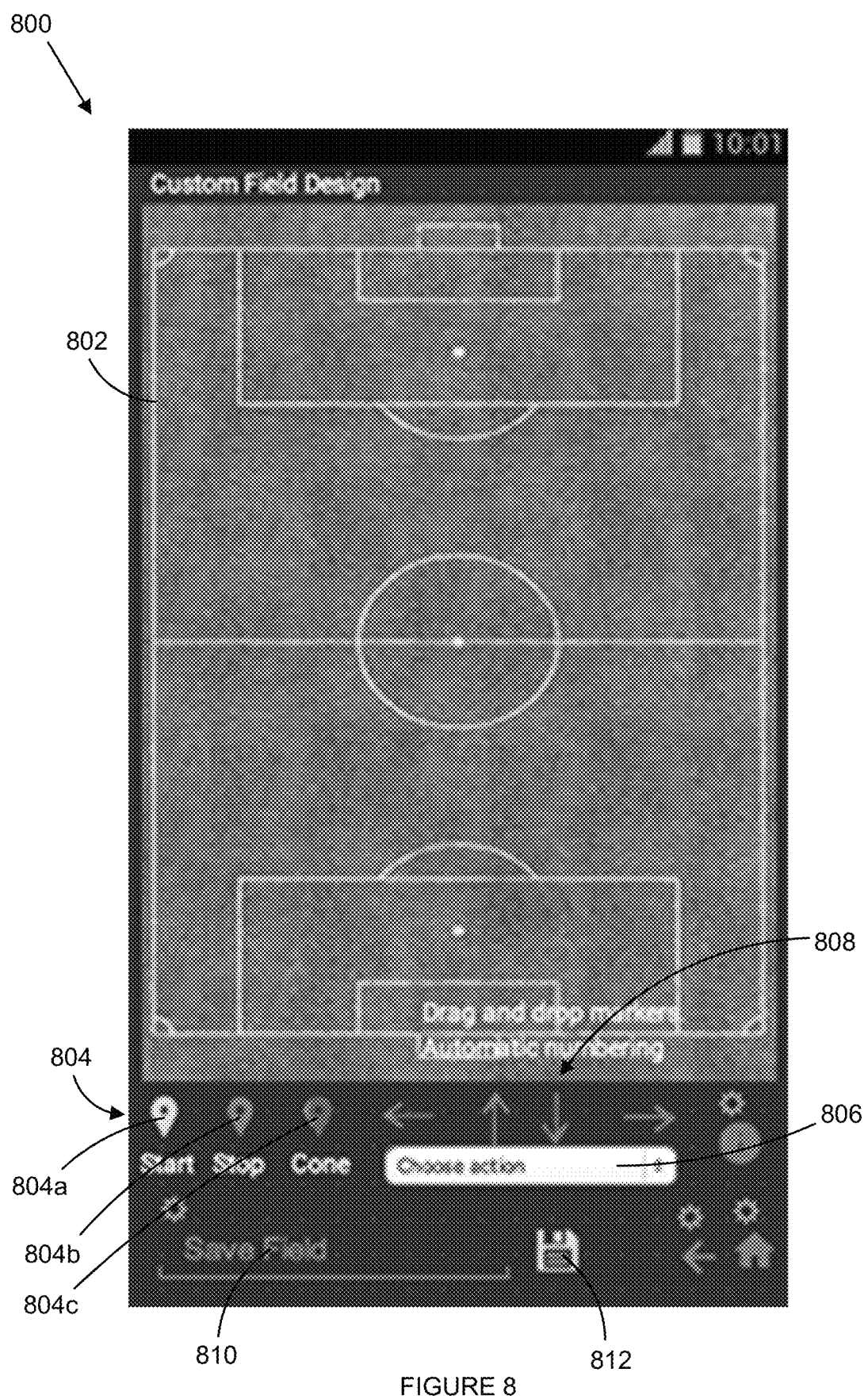
FIG. 8 illustrates another example user interface 800, according to various embodiments.

FIG. 8 illustrates another example user interface 800, according to various embodiments. The user interface 800 may be displayed by a software application operating on a mobile device (such as the mobile device 102 (FIG. 1) and/or the mobile device 202 (FIG. 2)). For example, the user interface 800 may be a webpage displayed within a web browser of the mobile device in some embodiments. The user interface 800 may be displayed in response to operator interaction with the start icon 612 (FIG. 6). In particular, the user interface 800 may be displayed based on the operator selecting to define a new drill in the user interface 600 (FIG. 6). The user interface 800 may assist the operator in defining the new drill.

The user interface 800 includes a training surface representation 802. The training surface representation 802 may represent a training surface on which the drill is to be setup. The training surface may be the same training surface selected in the representation 602 (FIG. 6). The training surface representation 802 is initially illustrated without any sport marker indicators (such as the sport marker indicators 704 (FIG. 7)) positioned on the training surface representation 802.

The user interface 800 further includes sport marker addition icons 804. The sport marker addition icons 804 may include a start marker addition icon 804a, a stop marker addition icon 804b, and a general marker addition icon 804c. In response to an operator interacting with the sport marker addition icons 804, the user interface 800 may produce a sport marker indicator (such as the sport marker indicators 704) corresponding the particular sport marker addition icon with which the operator interacted for positioning. For example, in response to the operator interacting with the start marker addition icon 804a, the user interface 800 may display a start sport marker indicator or transition the start marker addition icon 804a to a start sport marker indicator for positioning on the training surface representation 802. The user interface 800 may limit a number of the certain types of sport marker indicators that may be produced, such as limiting the number of start sport marker indicators to one and limiting the number of stop sport marker indicators to one. In some embodiments, the user interface 800 may only allow certain ones of the sport marker addition icons 804 to be interacted with at a time, such as requiring the start marker addition icon 804a to be interacted with first and the start sport marker indicator being placed prior to allowing the operator to interact with the other sport marker addition icons 804.

The operator may begin by interacting with the start marker addition icon 804a and positioning the start sport marker indicator on the training surface representation 802. The user interface 800 may further include a plurality of arrow icons 808 that may be utilized by the operator to position the start sport marker indicator. Alternatively, or in addition to the plurality of arrow icons 808, the user interface 800 may allow the user to drag the start sport marker indicator to the desired position.

After the start sport marker indicator has been positioned, the operator may interact with either of the stop marker addition icon 804b or the general marker addition icon 804c, and position (via the plurality of arrow icons 808 or dragging the sport marker indicator) the corresponding sport marker indicator produced by the interaction. Once the subsequent sport marker indicator has been placed, the user interface 800 may produce a path (such as the paths 706 (FIG. 7)) that extends between the sport marker indicator that was positioned just previous to the subsequent sport marker indicator and the subsequent sport marker indicator. The user interface 800 further includes an action field 806, which is illustrated as an action drop-down menu. The action field 806 allows the operator to associate an action (such as jog, sidestep, run, sprint, backpedal, karaoke step, high knee run, perform dance moves, repel, and/or high heel run) with paths between the sport marker indicators and/or associate an action with the sport marker (such as tackle, shoot, pass, and/or perform another sport action). In particular, once the path is generated between the two sport marker indicators, the user interface 800 may prompt the user to indicate an action in the action field 806 to be associated with the path. When the drill is being performed by a user, the sport marker system may direct the user to perform the indicated action while traveling between the sport markers corresponding to the path with which the action is associated. In other embodiments, the operator may indicate between which sport markers the paths should extend at a later time and/or associate the actions with the paths at a later time. The operator may continue positioning sport marker indicators and associating actions with the paths until the operator has produced the desired drill.

The user interface 800 further includes a save field 810. The save field 810 allows the operator to save the completed drill, or the completed portion of the drill, for later access and use. The operator may input a value into the save field 810 and interact with a save icon 812 to save the drill under the value. The mobile device may save the drill on the mobile device and/or save the drill to a remote server. The operator can then access the drill using the value and/or select the value from the training selection field 608.

Figure 9:
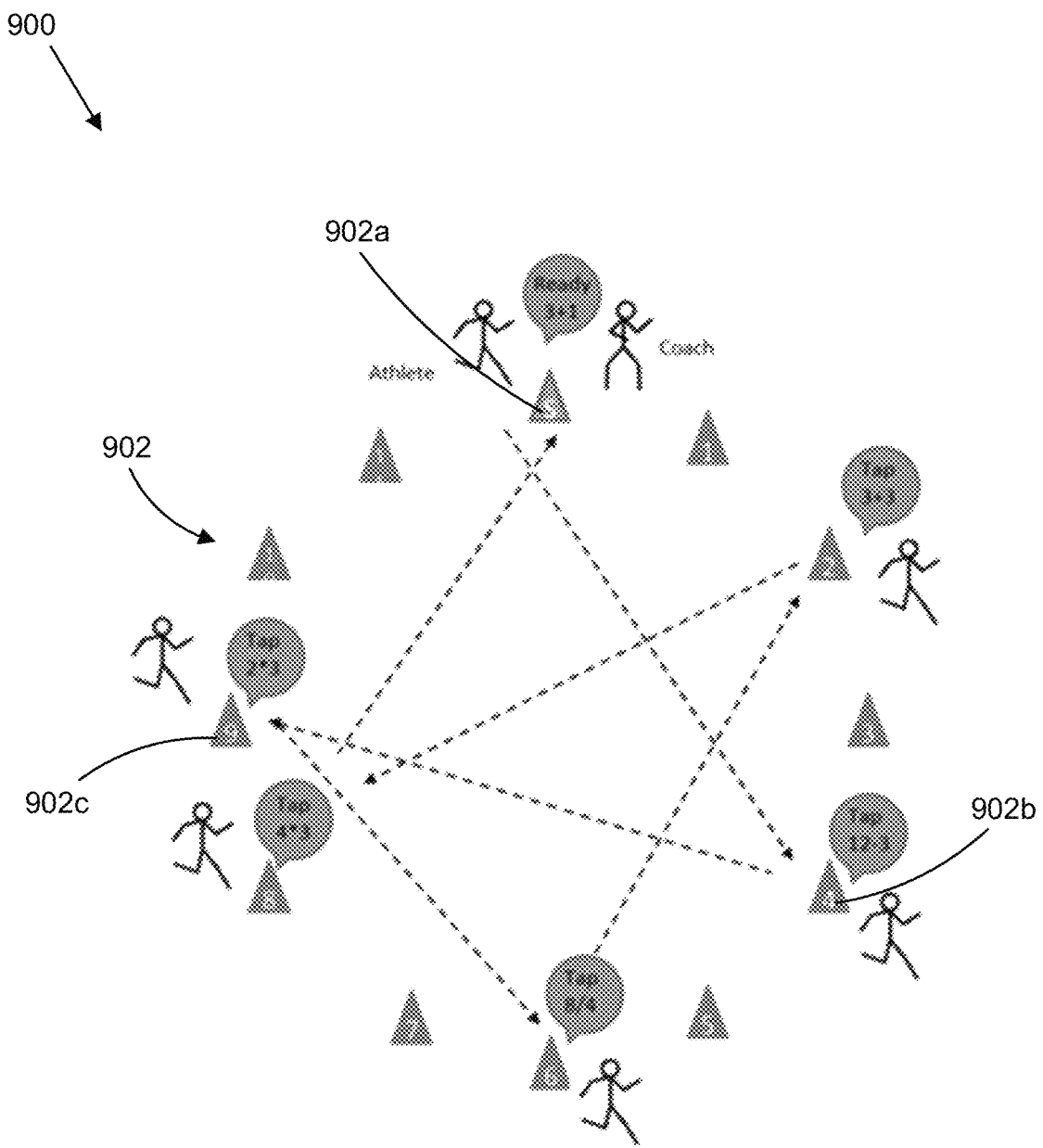
FIG. 9 illustrates an example performance of a drill arrangement 900, according to various embodiments.

FIG. 9 illustrates an example performance of a drill arrangement 900, according to various embodiments. Setup of the drill arrangement 900 may be facilitated by one or more of the user interfaces operating on a mobile device, such as the user interface 600 (FIG. 6), the user interface 700 (FIG. 7), and/or the user interface 800 (FIG. 8). The particular drill arrangement 900 may facilitate educational training in addition to physical training.

The drill arrangement 900 includes a plurality of sport markers 902. In particular, the drill arrangement 900 includes twelve sport markers arranged in a circle. Each of the sport markers 902 may include one or more of the features of the sport markers 106 (FIG. 1), the sport markers 206 (FIG. 2), the sport marker 300 (FIG. 3), and/or the sport marker 400 (FIG. 4). Each of the sport markers 902 may include a number displayed on the sport marker. For example, the number may be displayed by an indicator (such as the indicator 306) of the sport marker or otherwise marked on the sport marker.

A user may start performance of the drill by contacting a contact sensor (such as the contract sensor 310 (FIG. 3) and/or the position sensor 520 (FIG. 5)) of a starting sport marker, which is a twelfth sport marker 902a that is labeled with the number twelve in the illustrated embodiment. In other embodiments, a user may start performance of the drill by moving within a certain proximity of the starting sport marker. Further, performance of the drill may be started through operator interaction with a user interface displayed on a mobile device (such as the mobile device 102 (FIG. 1) and/or the mobile device 202 (FIG. 2)) that indicates that the drill is to be started. In response to detecting the start of the drill, the starting sport marker may audibly emit (such as from speaker 308 (FIG. 3)) an equation indicating a sport marker to which the user is to proceed. In particular, the starting sport marker emits the equation "3+1" to indicate that the user is to proceed to a fourth sport marker 902b, which has the number four displayed thereon. The equation may be generated by either the mobile device and transmitted to the starting sport marker, or may be generated by a processor (such as the CPU 502 (FIG. 5)) of the starting sport marker. The processor may cause the equation to be emitted by the speaker.

The user may proceed to the fourth sport marker 902b. In instances where the user mistakenly proceeds to the incorrect sport marker, the starting sport marker or another of the sport markers may repeat the equation "3+1." In response to detecting contact with a contact sensor of the fourth sport marker 902b or detecting the user being within a certain proximity of the fourth sport marker 902b, the fourth sport marker 902b may audibly emit another equation indicating a sport marker to which the user is to proceed after the fourth sport marker 902b. In particular, the fourth sport marker 902b emits the equation "12−3" to indicate that the user is to proceed to a ninth sport marker 902c, which has the number nine displayed thereon. The drill may proceed as described until an end condition of the drill is met or an operator indicates that the drill is to be stopped via the mobile device.

In some instances, multiple users may perform the drill at the same time. For example, a first user may start at the twelfth sport marker 902a, while a second user may start at the fourth sport marker 902b. The drill may start in response to one or both of the first user and the second user contacting their respective sport markers. In response to the start of the drill, the twelfth sport marker 902a may emit an equation indicating a sport marker to which the first user is to proceed and the fourth sport marker 902b may emit an equation indicating a sport marker to which the second user is to proceed. The paths to be traveled by the first user and the second user may cross causing the users to have to dodge each other, which may train the users reaction times, decision-making skills, and peripheral vision as the users attempt to proceed to indicated cone without colliding.

Figure 10:
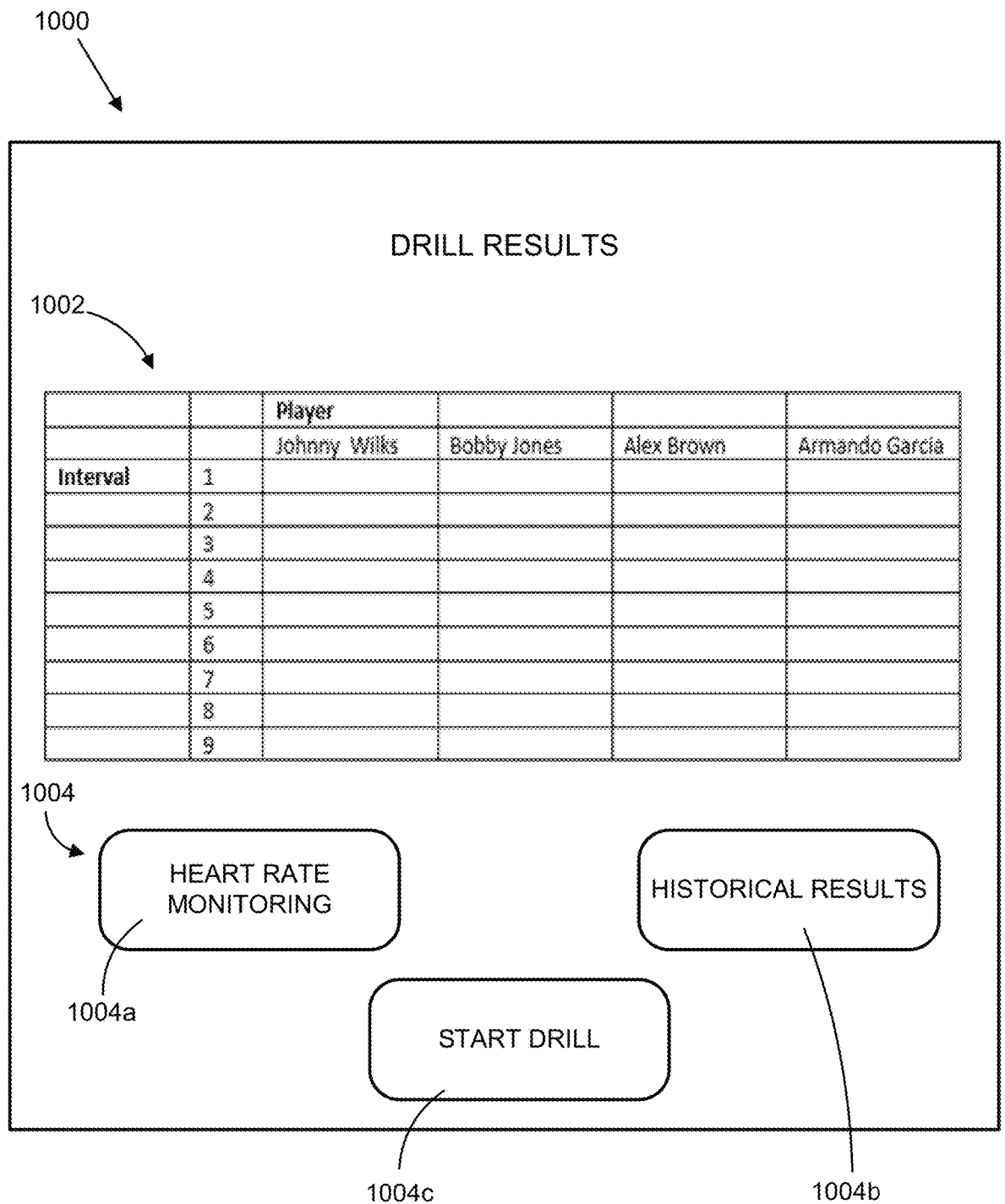
FIG. 10 illustrates an example results user interface 1000, according to various embodiments.

FIG. 10 illustrates an example results user interface 1000, according to various embodiments. The results user interface 1000 may be displayed on a mobile device (such as the mobile device 102 (FIG. 1) and/or the mobile device 202 (FIG. 2)). The result user interface 1000 may be displayed in response to an operator indicating that a drill is to be started, in response to detection of an interaction with one of a plurality of sport markers (such as the sport markers 106 (FIG. 1), the sport markers 206 (FIG. 2), sport marker 300 (FIG. 3), the sport marker (FIG. 4), and/or the plurality of sport markers 902 (FIG. 9)) that indicates that a drill is to be started, or in response to an operator interaction with the mobile device that comprises a request to have the results user interface 1000 displayed.

The results user interface 1000 includes an object 1002 for displaying the results of a drill. In the illustrated embodiment, the object 1002 is a table that includes the users to perform the drill (which may have been defined in the user interface 600 (FIG. 6)), the intervals of the drill (which may correspond to the paths between the sport markers), and spaces to present the results of the drill for each user that is to perform the drill. In other embodiments, the object 1002 may include other representations of the results of the drill, including a table, a chart, a graph, or some combination thereof.

The results user interface 1000 may further include one or more buttons 1004. The buttons 1004 may include buttons that link to other user interfaces that display data and/or results associated with the drill. For example, the buttons 1004 include a heart rate monitoring button 1004a that links to a user interface that displays heart rates of the users and a historical results button 1004b that links to a user interface that displays previous results of the performance of the drill. In response to detecting operator interaction with buttons that link to other user interfaces, the mobile device may display the user interface associated with the button. For example, the mobile device may display a user interface displaying heart rates of the users in response to detecting operator interaction with the heart rate monitoring button 1004a. In other embodiments, the data and/or results displayed in the user interfaces associated with the buttons corresponding to links may be displayed in the user interface 1000 and the buttons corresponding to links may be omitted.

The buttons 1004 may include a start drill button 1004c. The start drill button 1004c indicates that the drill is to be started. For example, the mobile device and/or the sport markers system (such as the sport marker system 104 (FIG. 1) and/or the sport marker system 204 (FIG. 2)) may monitor for a user interaction with a starting sport marker in response to the operator interacting with the start drill button 1004c, where the user interaction with the starting sport marker indicates that operations associated with the drill should be initiated. The operations may include capturing data and/or providing instructions (such as through emitting instructions through the speaker and/or displaying instructions by the indicator) to the user on performing the drill.

Figure 11:
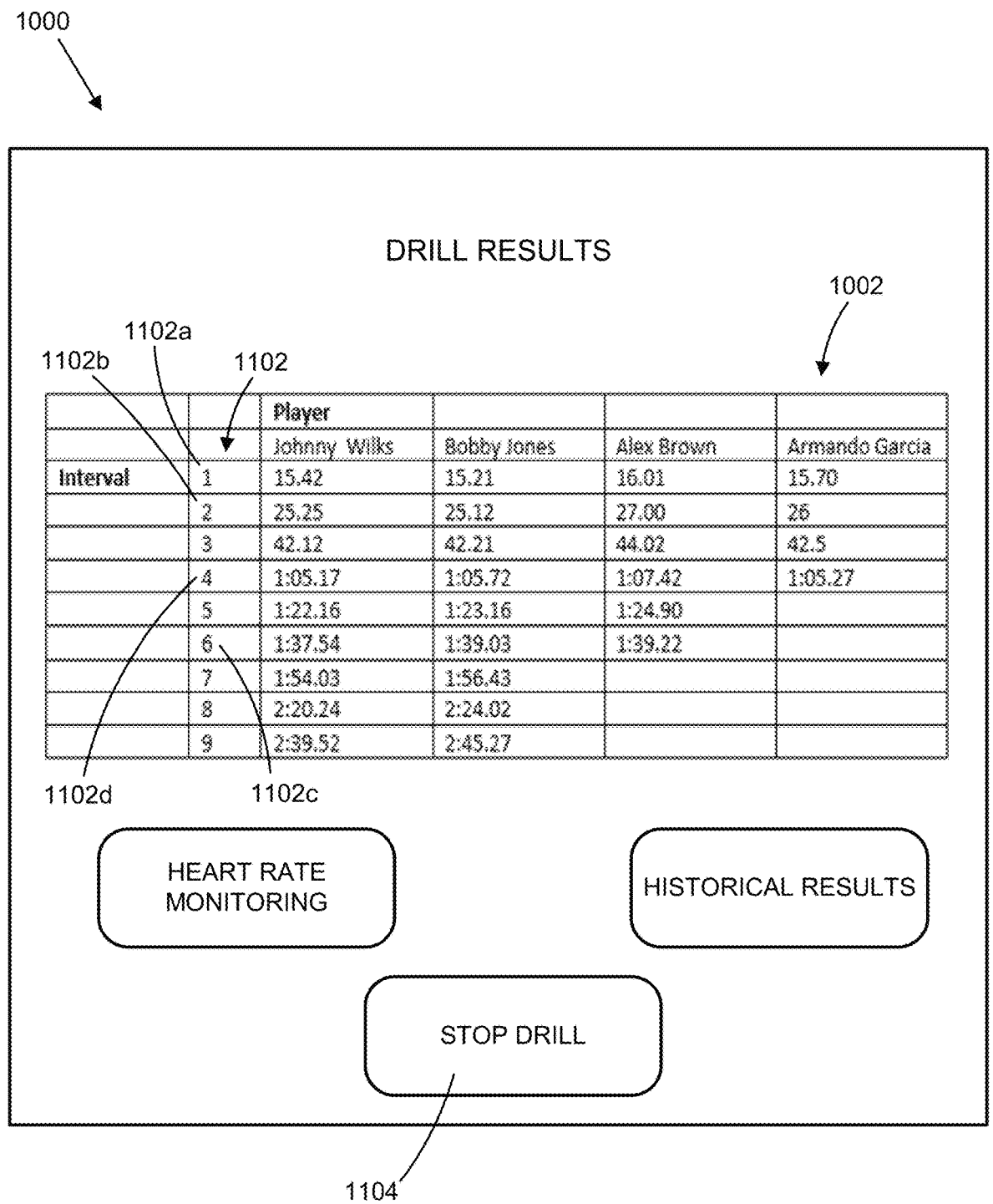
FIG. 11 illustrates the example results user interface 1000 of FIG. 10 with results displayed, according to various embodiments.

FIG. 11 illustrates the example results user interface 1000 of FIG. 10 with results displayed, according to various embodiments. In particular, the object 1002 shows results of the performance of the drill for each of the users performing the drill. The results may be displayed in real-time, or near real-time, as the users perform the drill. Further, the results of each interval may be displayed as the user completes the interval.

In the illustrated embodiment, results of a drill having a plurality of intervals 1102 are displayed. Each interval 1102 may correspond to a path extending between two of the sport markers. For example, a first interval 1102a may correspond to a path between a starting sport marker and a second sport marker in the drill, a second interval 1102b may correspond to a path between the second sport marker and a third sport marker in the drill, and so forth. The results display a time from when the user started the drill to when the user completed the interval. For example, Johnny Wilks contacted or was within a proximity of the second sport marker at 15.42 seconds from when he started the drill, and contacted or was within a proximity of the third sport marker at 25.25 seconds from when he started the drill. In other embodiments, the results may display the amount of time that it took for the user to complete the interval (ex., the amount of time that it took the user to proceed from the starting sport marker to the second sport marker may be displayed for the first interval 1102a and the amount of time that it took the user to proceed from the second sport marker may be displayed for the second interval 1102b). Further, the results may display other data captured by the sport marker system (such as the sport marker system 104 (FIG. 1) and/or the sport marker system 204 (FIG. 2)) and may not be limited to displaying time results. For example, the results may include information that indicates a current condition of the users performing the drill, such as heart rates of the user. Further, the results may be displayed in formats other than table format, such as charts, graphs, or other graphical displays that provide analysis of the performance of the drills.

In the illustrated embodiment, Alex Brown and Armando Garcia are shown as still performing the drill. In particular, the results for Alex Brown are displayed through a sixth interval 1102c and the results for Armando Garcia are displayed though a fourth interval 1102d. As Alex and Armando complete further intervals, the results for each further interval completed by Alex and Armando may be displayed in real-time or near real-time.

Further, the user interface 1000 may include a stop drill button 1104. The user interface 1000 may have displayed the stop drill button 1104 in response to determining that performance of the drill had begun. In the illustrated embodiment, the stop drill button 1104 replaced the start drill button 1004c. In other embodiments the stop drill button 1104 may be added, while the start drill button 1004c remains included in the user interface 1000. In response to operator interaction with the stop drill button 1104, the drill may be ceased, and the mobile device and the sport marker system may cease performing operations associated with the drill, such as the capture of data and/or providing instructions to the user. In other embodiments, the stop drill button 1104 may be replaced by, or additional buttons may be included in the user interface 1000 including, a pause button that allows the operator to pause performance of the drill, a modify button that allows the operator to dynamically modify the drill during performance (such as changing the actions to be performed by the user between sport markers), or some combination thereof.

Figure 12:
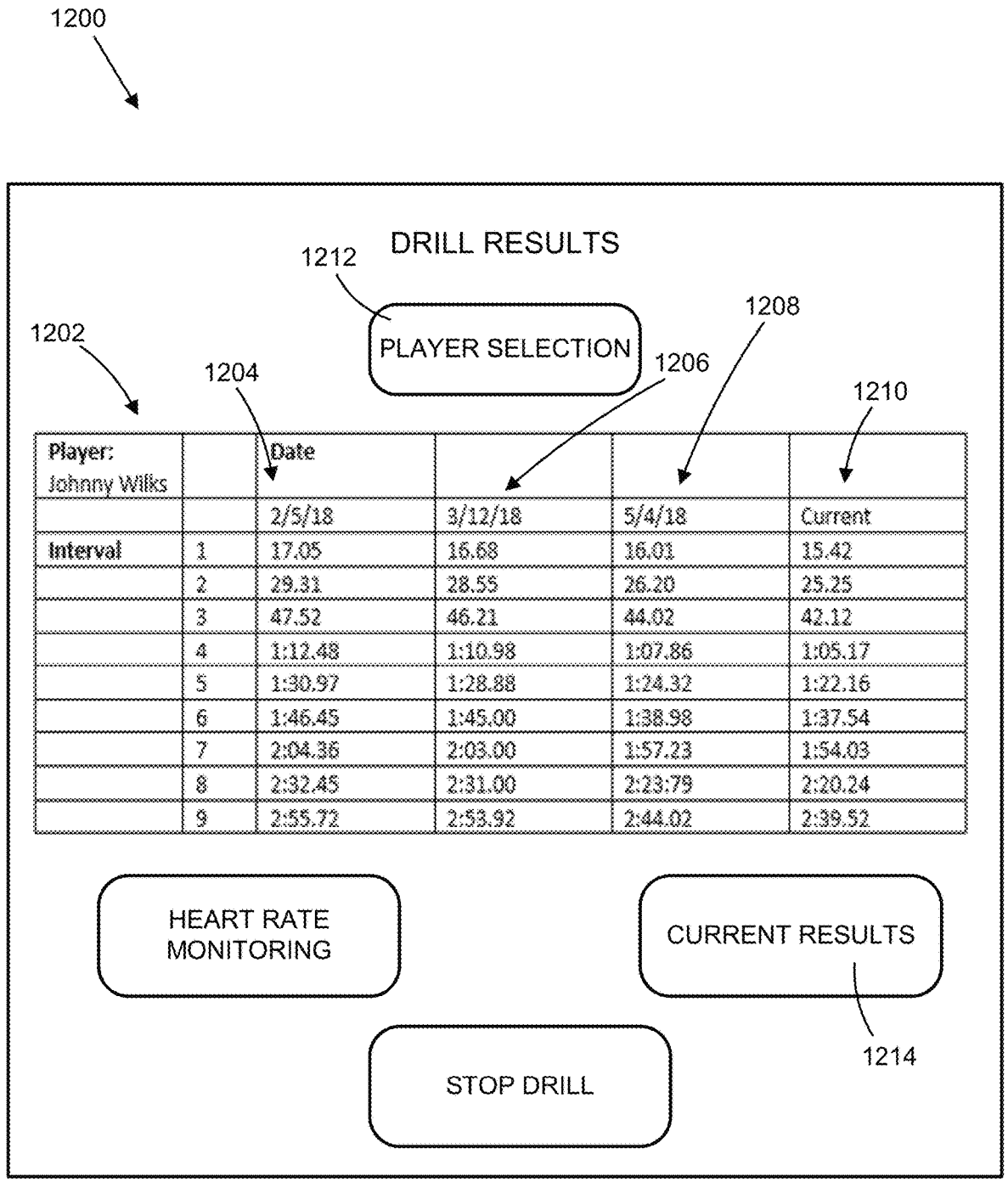
FIG. 12 illustrates an example historical results user interface 1200, according to various embodiments.

FIG. 12 illustrates an example historical results user interface 1200, according to various embodiments. The historical results user interface 1200 may be displayed on a mobile device (such as the mobile device 102 (FIG. 1) and/or the mobile device 202 (FIG. 2)). For example, the historical results user interface 1200 may be displayed on the mobile device in response to an operator interaction with the historical results button 1004b (FIG. 10).

The historical results user interface 1200 may display results of performance of a drill for a user or users at multiple different times. In particular, the historical results user interface 1200 may include an object 1202 that displays the results of the performance of the drill for multiple different times. In the illustrated embodiment, the results are illustrated for user Johnny Wilks at four different times that Johnny performed the drill. In particular, the object 1202 shows results at first time 1204 of Feb. 5, 2018, a second time 1206 of Mar. 12, 2018, a third time 1208 of May 4, 2018, and a current performance 1210. Displaying the results at multiple different times may facilitate evaluation of a user's progress. This may be advantageous in determining progress of a user from recovering from injury. An operator may further be able to define which dates of the completion of the drill are to be displayed, such that the historical results user interface 1200 provides results of performance of the drill prior to an injury of the user and current results of performance of the drill to determine if the user has returned to the condition that the user was at prior to the injury. The previous results may be retrieved from a memory device of the mobile device, may be retrieved from a remote server (such as the remote server 536), or some combination thereof.

The historical results user interface 1200 may further include a player selection button 1212. The operator may interact with the player selection button 1212 to change a player for whom the results are displayed. For example, the historical results user interface 1200 may present a prompt providing a list of users for selection in response to detecting operator interaction with the player selection button 1212. In response to operator indicating a user from the list of users, the object 1202 may update to show the results for the indicated user.

The historical results user interface 1200 may further include a current results button 1214. An operator may interact with the current results button 1214 to display a current results user interface, such as the user interface 1000.

Figure 13:
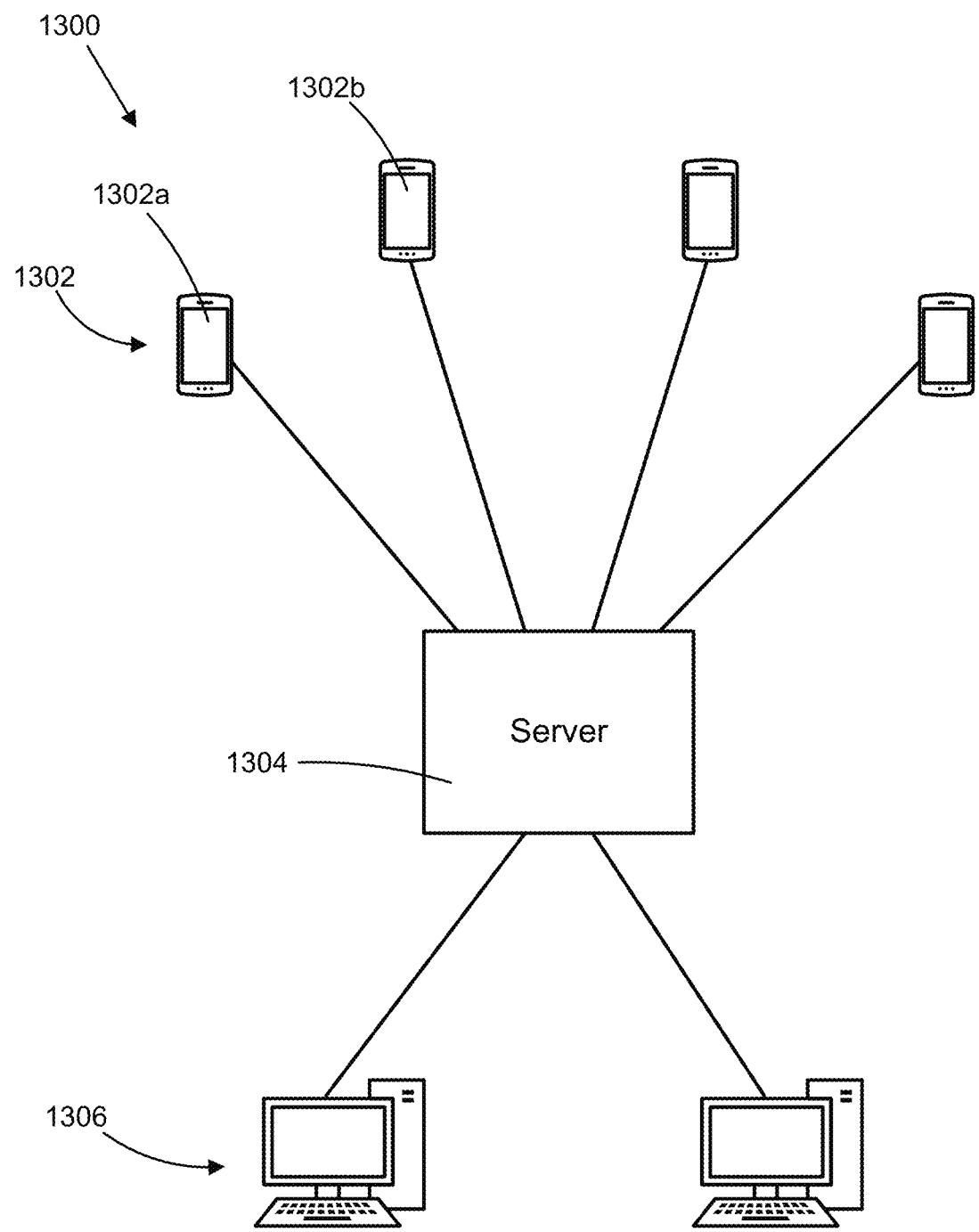
FIG. 13 illustrates an example network 1300, according to various embodiments.

FIG. 13 illustrates an example network 1300, according to various embodiments. In particular, the illustrated network 1300 is an example of a network that may be utilized for storing and/or sharing features of the trainer system described throughout. For example, the network 1300 may allow operators to store and/or share results of user performance of drills and drill arrangements with other operators and users of the network 1300.

The network 1300 includes a plurality of mobile devices 1302. The mobile devices 1302 may include one or more of the features of the mobile device 102 (FIG. 1) and/or the mobile device 202 (FIG. 2). Each of the mobile devices 1302 may couple to a sport marker system, such as the sport marker system 104 (FIG. 1) and/or the sport marker system 204 (FIG. 2). The mobile devices 1302 may perform the operations performed by the mobile devices described throughout, including facilitating performance of drills using the sport marker system, receive results of the performance of the drills from the sport marker system, and display the results of the performance of the drills.

The network 1300 further includes a server 1304. The server 1304 may include one or more of the features of the remote server 536 (FIG. 5). For example, the server 1304 may be part of the cloud and may provide cloud services for central hosting of information and/or a website associated with a trainer system. Each of the mobile devices 1302 may establish a wireless connection with the server 1304 and exchange data with the server 1304. For example, each of the mobile devices 1302 may store results of performance of drills and drill arrangements on the server 1304, and may retrieve results of performance of drills and drill arrangements from the server 1304. Further, the server 1304 may facilitate exchange of data between the mobile devices 1302. For example, an operator may define a drill arrangement on a first mobile device 1302a and provide the drill arrangement to the server 1304 for storage with an indication that the drill arrangement may be shared with other operators. A second mobile device 1302b may retrieve the drill arrangement from the server 1304 and facilitate performance of the drill arrangement. The operator may further indicate whether drill arrangements and/or results may be shared with other devices when uploading to the server 1304, or if the drill arrangements and/or results are to be kept confidential to only be accessible by authorized operators.

In embodiments where drill arrangements are retrieved from the server 1304, characteristics (such as distances and/or directions between sport markers, and/or the types of sport markers) of the drill arrangements may be maintained or may be adapted. In some embodiments, the operator who defined the drill may limit whether the drill arrangement can be adapted to the training surface. When the characteristics of the drill arrangements are maintained, the characteristics of the drill arrangement may be the same independent of the mobile device utilized to set up the drill arrangement and/or the location where the drill arrangement is to be set up. For example, the distance between the sport markers, the directions between the sport markers, and the types of the sport markers may be the same for the drill arrangement when set up in Portland, Oregon with a first mobile device as they would be when the drill arrangement is set up in Liverpool, England by a second mobile device when the characteristics of the drill arrangement is maintained. In embodiments where the drill arrangements are adapted, the distance between the sport markers, the directions between the sport markers, and/or the types of the sport markers may be different from the originally defined drill arrangement based on the adaptation. In some embodiments, the drill arrangements may be adapted based on the surface on which the drill arrangements are to be set up, the sport markers available for set up of the drill arrangements, or some combination thereof.

The network 1300 may further include a plurality of computer devices 1306. The computer devices 1306 may include mobile devices, but also may include other computer devices, such as desktop computers, servers, and/or computer devices greater than 10 pounds. The computer devices 1306 may be capable of displaying results retrieved from the server 1304, defining drill arrangements, storing the drill arrangements on the server 1304 (which may be accessed by the mobile devices 1302), or some combination thereof.

The sharing of the results and/or drill arrangements among the mobile devices 1302 and the computer devices 1306 may allow for competition between users performing the drills. For example, a user may be able to see how his results of performing a drill compare to other users, which may motivate the user to work harder to improve to beat the other users. Further, sharing of the results and/or drill arrangements may assist coaches in identifying players to recruit. For example, coaches may develop drill arrangements that they would like use to evaluate players for skills they desire in their players and may share the drill arrangements with the mobile devices 1302. The coaches may receive the results of performance of the drill arrangements and may identify players that performed well when performing the drill.

In some embodiments, the results may be aggregated for evaluating certain populations of users. For example, the server 1304 may identify results associated with a certain population of users (such as users based in a certain country, a certain geographical region, a certain age group, a certain gender group, or some combination thereof) and retrieve the results associated with the certain population from memory of the server 1304. The server 1304 may remove information identifying the users associated with the results and aggregate the results to produce anonymous data that may be provided to the mobile devices 1302 and/or the computer devices 1306. The anonymous data may be utilized for research that can be utilized for determining the physical fitness of the certain population and facilitate improving or maintaining the physical fitness of the certain population.

The following includes some example embodiments of systems, apparatuses, computer-readable media, and/or methods envisioned in accordance with the disclosure herein. It is to be understood that embodiments envisioned is not limited to the provided examples.

Example 1 may include a sport marker, comprising wireless circuitry to establish a wireless connection with a mobile device, and a processor coupled to the wireless circuitry, the processor to receive an indication of a location at which the sport marker is to be positioned, and cause instructions to be provided to a user to facilitate positioning of the sport marker at the location.

Example 2 may include the sport marker of example 1, further comprising a speaker, wherein to cause the instructions to be provided includes to cause the instructions to be audibly emitted from the speaker.

Example 3 may include the sport marker of example 2, further comprising Wi-Fi circuitry, wherein the processor is further to determine a distance between the sport marker and a second sport marker via the Wi-Fi circuitry, and determine the location at which the sport marker is to be positioned based on the distance.

Example 4 may include the sport marker of example 2, wherein the processor is further to determine a current position of the sport marker, and determine a distance between the current position of the sport marker and the location, wherein to cause the instructions to be provided includes to audibly emit the distance via the speaker.

Example 5 may include the sport marker of example 1, further comprising a position sensor to detect a presence of the user, wherein the processor is further to capture a time that the position sensor detects the presence of the user, and provide the time to the mobile device.

Example 6 may include the sport marker of example 5, wherein the position sensor comprises a contact sensor, and wherein to detect the presence of the user includes to detect contact of the user with the contact sensor.

Example 7 may include the sport marker of example 5, wherein the position sensor comprises a radio-frequency identification (RFID) sensor, and wherein to detect the presence of the user includes to detect that an RFID tag worn by the user is within a proximity of the RFID sensor.

Example 8 may include the sport marker of example 5, further comprising a speaker, wherein the processor is further to cause instructions on how the user is to proceed from the sport marker to be audibly emitted from the speaker in response to the position sensor detecting the presence of the user.

Example 9 may include the sport marker of example 8, wherein the instructions include a direction that the user is to proceed from the sport marker and an action the user is to perform while proceeding from the sport marker.

Example 10 may include the sport marker of example 1, further comprising an arrow element, and an actuator to position the arrow element to point in a direction that the user is to proceed from the sport marker.

Example 11 may include the sport marker of example 1, further comprising a display to indicate a direction that the user is to proceed from the sport marker.

Example 12 may include the sport marker of example 1, wherein the sport marker comprises a cone.

Example 13 may include a sport marker system, comprising a first sport marker, and a second sport marker that is to establish a wireless connection with the first sport marker, wherein the second sport marker is to determine a distance between the first sport marker and the second sport marker via the wireless connection, and wherein the second sport marker is to indicate a difference between the distance and a target distance that the second sport marker is to be positioned from the first sport marker.

Example 14 may include the sport marker system of example 13, wherein the first sport marker is to detect contact with the first sport marker by a user, and wherein the first sport marker is to provide an indication to proceed to the second sport marker to the user in response to detecting the contact with the first sport marker.

Example 15 may include the sport marker system of example 14, wherein to provide the indication includes to audibly emit instructions to proceed to the second sport marker, and wherein the first sport marker is further to audibly indicate an action that the user is to perform while proceeding to the second sport marker.

Example 16 may include the sport marker system of example 13, wherein the second sport marker is to receive an indication of the target distance from a mobile device.

Example 17 may include the sport marker system of example 13, wherein the second sport marker wherein the second sport marker is to detect an indication that the second sport marker has been positioned, and wherein the first sport marker and the second sport marker are to verify positioning in response to the second sport marker detecting the indication.

Example 18 may include the sport marker system of example 13, further wherein the first sport marker includes an arrow element and an actuator to position the arrow element to point at the second sport marker once the first sport marker and the second sport marker have been positioned.

Example 19 may include one or more computer-readable media having instructions stored thereon, wherein the instructions, in response to execution by a mobile device, cause the mobile device to detect an indication of a drill arrangement, establish a wireless connection with a sport marker, determine a position for the sport marker based on the drill arrangement, and provide an indication of the position to the sport marker to facilitate positioning of the sport marker.

Example 20 may include the one or more computer-readable media of example 19, wherein the indication of the position includes an indication of a distance that the sport marker is to be positioned away from a second sport marker.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A sport marker, comprising:
a housing;
wireless circuitry disposed on or within the housing and configured to establish a wireless connection with a remote device external to the sport marker; and
a processor disposed on or within the housing and coupled to the wireless circuitry, the processor configured to:
  receive from the remote device, over the wireless connection, an indication of a geographic location in a play area at which the sport marker is to be positioned;
  determine the sport marker's current location relative to the geographic location at which the sport marker is to be positioned; and
  cause instructions to be provided, if the current location is different than the location at which the sport marker is to be positioned, to an operator of the device to facilitate positioning of the sport marker at the location.

2. The sport marker of claim 1, further comprising a speaker, wherein to cause the instructions to be provided includes to cause the instructions to be audibly emitted from the speaker.

3. The sport marker of claim 2, further comprising Wi-Fi circuitry, wherein the processor is further to:
determine a distance between the sport marker and a second sport marker via the Wi-Fi circuitry; and determine the location at which the sport marker is to be positioned based on the distance.

4. The sport marker of claim 2, wherein the processor is further to:
   determine a current position of the sport marker; and
   determine a distance between the current position of the sport marker and the location,
   wherein to cause the instructions to be provided includes to cause the distance to be audibly emitted via the speaker.

5. The sport marker of claim 1, further comprising a position sensor to detect a presence of the user, wherein the processor is further to:
   capture a time that the position sensor detects the presence of the user; and
   provide the time to the mobile device.

6. The sport marker of claim 5, wherein the position sensor comprises a contact sensor, and wherein to detect the presence of the user includes to detect contact of the user with the contact sensor.

7. The sport marker of claim 5, wherein the position sensor comprises a radio-frequency identification (RFID) sensor, and wherein to detect the presence of the user includes to detect that an RFID tag worn by the user is within a proximity of the RFID sensor.

8. The sport marker of claim 5, further comprising a speaker, wherein the processor is further to cause instructions on how the user is to proceed from the sport marker to be audibly emitted from the speaker in response to the position sensor detecting the proximity of the user.

9. The sport marker of claim 8, wherein the instructions include a direction that the user is to proceed from the sport marker and an action the user is to perform while proceeding from the sport marker.

10. The sport marker of claim 1, further comprising:
    an arrow element; and
    an actuator to position the arrow element to point in a direction that the user is to proceed from the sport marker.

11. The sport marker of claim 1, further comprising a display to indicate a direction that the user is to proceed from the sport marker.

12. The sport marker of claim 1, wherein the sport marker comprises a cone.

13. A sport marker system, comprising:
    a first sport marker equipped with a wireless transceiver and configured to communicate with a remote device and one or more additional sport markers; and
    a second sport marker configured to communicate wirelessly with the first sport marker,
    wherein the first sport marker is to receive an indication from the remote device of a first position for the first sport marker and a second position for the second sport marker, and the first sport marker is to communicate the second position to the second sport marker,
    wherein the second sport marker is to determine, from the second position, a distance between the first sport marker and the second sport marker via the wireless connection, and
    wherein the second sport marker is to indicate a difference between the distance and a target distance, if a difference exists, that the second sport marker is to be positioned from the first sport marker.

14. The sport marker system of claim 13, wherein the first sport marker is to detect contact with the first sport marker by a user, and wherein the first sport marker is to provide an indication to proceed to the second sport marker to the user in response to detecting the contact with the first sport marker.

15. The sport marker system of claim 14, wherein to provide the indication includes to audibly emit instructions to proceed to the second sport marker, and wherein the first sport marker is further to audibly indicate an action that the user is to perform while proceeding to the second sport marker.

16. The sport marker system of claim 13, wherein the second sport marker is to receive an indication of the target distance from a mobile device.

17. The sport marker system of claim 13, wherein the second sport marker is to detect an indication that the second sport marker has been positioned, and wherein the first sport marker and the second sport marker are to verify positioning in response to the second sport marker detecting the indication.

18. The sport marker system of claim 13, further wherein the first sport marker includes:
    an arrow element; and
    an actuator to position the arrow element to point at the second sport marker once the first sport marker and the second sport marker have been positioned.

19. One or more non-transitory computer-readable media having instructions stored thereon, wherein the instructions, in response to execution by a mobile device, cause the mobile device to:
    detect an indication of a drill arrangement within a play area;
    establish a wireless connection with a sport marker;
    determine a desired geographic position for the sport marker within the play area based on the drill arrangement;
    transmit the desired geographic position to the sport marker;
    receive, from the sport marker over the wireless connection, its current location; and
    if the current location is different from the desired position, provide an indication of the location of the sport marker relative to the desired position to facilitate positioning of the sport marker.

20. The one or more computer-readable media of claim 19, wherein the indication of the position includes an indication of a distance that the sport marker is to be positioned away from a second sport marker.

* * * * *